US009744722B2

(12) United States Patent
Rodgers

(10) Patent No.: US 9,744,722 B2
(45) Date of Patent: Aug. 29, 2017

(54) ADDITIVE MANUFACTURING WITH POLYAMIDE CONSUMABLE MATERIALS

(71) Applicant: Stratasys, Inc., Eden Prairie, MN (US)

(72) Inventor: Luke M. B. Rodgers, Chaska, MN (US)

(73) Assignee: Stratasys, Inc., Eden Prairie, MN (US)

( * ) Notice: Subject to any disclaimer, the term of this patent is extended or adjusted under 35 U.S.C. 154(b) by 623 days.

(21) Appl. No.: 14/077,703

(22) Filed: Nov. 12, 2013

(65) Prior Publication Data

US 2014/0141168 A1 May 22, 2014

Related U.S. Application Data

(63) Continuation-in-part of application No. 13/833,526, filed on Mar. 15, 2013.

(60) Provisional application No. 61/729,043, filed on Nov. 21, 2012.

(51) Int. Cl.
| | | |
|---|---|---|
| *B29C 67/00* | (2017.01) | |
| *C09D 177/06* | (2006.01) | |
| *B33Y 10/00* | (2015.01) | |
| *C08L 77/02* | (2006.01) | |
| *C08L 77/06* | (2006.01) | |
| *B33Y 70/00* | (2015.01) | |
| *B29K 77/00* | (2006.01) | |

(52) U.S. Cl.
CPC ........ *B29C 67/007* (2013.01); *B29C 67/0055* (2013.01); *B33Y 10/00* (2014.12); *C08L 77/02* (2013.01); *C08L 77/06* (2013.01); *B29K 2077/00* (2013.01); *B33Y 70/00* (2014.12)

(58) Field of Classification Search
CPC ...................................... B29C 67/00
See application file for complete search history.

(56) References Cited

U.S. PATENT DOCUMENTS

| | | |
|---|---|---|
| 3,509,013 A | 4/1970 | Oppenlander |
| 4,247,508 A | 1/1981 | Housholder |
| 4,397,986 A | 8/1983 | Hornbaker |
| 4,551,369 A | 11/1985 | Belz |
| 4,609,714 A | 9/1986 | Harris et al. |
| 4,671,982 A | 6/1987 | Belz |
| 4,863,538 A | 9/1989 | Deckard |
| 4,870,148 A | 9/1989 | Belz et al. |
| 4,886,856 A | 12/1989 | Chen et al. |
| 4,938,816 A | 7/1990 | Beaman et al. |
| 4,944,817 A | 7/1990 | Bourell et al. |
| 5,017,753 A | 5/1991 | Deckard |
| 5,053,090 A | 10/1991 | Beaman et al. |
| 5,076,869 A | 12/1991 | Bourell et al. |
| 5,121,329 A | 6/1992 | Crump |
| 5,132,143 A | 7/1992 | Deckard |
| 5,155,324 A | 10/1992 | Deckard et al. |
| 5,296,062 A | 3/1994 | Bourell et al. |
| 5,303,141 A | 4/1994 | Batchelder et al. |
| 5,316,580 A | 5/1994 | Deckard |
| 5,340,433 A | 8/1994 | Crump |
| 5,342,919 A | 8/1994 | Dickens, Jr. et al. |
| 5,382,308 A | 1/1995 | Bourell et al. |
| 5,391,640 A | 2/1995 | Akkapeddi et al. |
| 5,402,351 A | 3/1995 | Batchelder et al. |
| 5,474,719 A | 12/1995 | Fan et al. |
| 5,503,785 A | 4/1996 | Crump et al. |
| 5,527,877 A | 6/1996 | Dickens, Jr. et al. |
| 5,597,589 A | 1/1997 | Deckard |
| 5,616,294 A | 4/1997 | Deckard |
| 5,639,070 A | 6/1997 | Deckard |
| 5,648,450 A | 7/1997 | Dickens, Jr. et al. |
| 5,653,925 A | 8/1997 | Batchelder |
| 5,695,707 A | 12/1997 | Almquist et al. |
| 5,764,521 A | 6/1998 | Batchelder et al. |
| 5,863,885 A | 1/1999 | Ruggieri et al. |
| 5,866,058 A | 2/1999 | Batchelder et al. |
| 5,939,008 A | 8/1999 | Comb et al. |
| 5,990,268 A | 11/1999 | Dickens, Jr. et al. |
| 6,004,124 A | 12/1999 | Swanson et al. |

(Continued)

FOREIGN PATENT DOCUMENTS

| | | |
|---|---|---|
| CA | 2834178 A1 | 12/2012 |
| EP | 2465884 A1 | 6/2012 |

(Continued)

OTHER PUBLICATIONS

European Extended Search Report dated May 13, 2016 for corresponding European Application No. 13857272.2, filed May 20, 2015.
International Search Report and Written Opinion dated Jan. 28, 2014 for corresponding International Patent Application No. PCT/US2013/069793, filed Nov. 13, 2013.
Chinese Office Action dated Jun. 14, 2016 for correspondence Chinese Application No. 201380070971.7, filed Jul. 20, 2015.
International Search Report and Written Opinion dated Nov. 15, 2016 for corresponding International Application No. PCT/US2016/034096, filed May 25, 2016.
Japanese Office Action dated Jan. 10, 2017 for corresponding Japanese Application No. 2015-544081, filed Nov. 13, 2013.
Korean Office Action dated Sep. 20, 2016 for corresponding Korean Application No. 10-2015-7016464, filed Nov. 12, 2013.
Canadian Office Action dated Oct. 12, 2016 for corresponding Canadian Application No. 2,891,473, filed May 13, 2015.

(Continued)

*Primary Examiner* — Robert Harlan
(74) *Attorney, Agent, or Firm* — Peter J. Ims; Westman, Champlin & Koehler, P.A.

(57) ABSTRACT

A consumable material for use in an additive manufacturing system, the consumable filament comprising a polyamide blend of at least one semi-crystalline polyamide, and at least one amorphous polyamide that is substantially miscible with the at least one semi-crystalline polyamide, and a physical geometry configured to be received by the additive manufacturing system for printing a three-dimensional part from the consumable material in a layer-by-layer manner using an additive manufacturing technique. The consumable material is preferably capable of printing three-dimensional parts having good part strengths and ductilities, and low curl.

18 Claims, 17 Drawing Sheets

(56) References Cited

U.S. PATENT DOCUMENTS

| | | |
|---|---|---|
| 6,022,207 A | 2/2000 | Dahlin et al. |
| 6,067,480 A | 5/2000 | Stuffle et al. |
| 6,070,107 A | 5/2000 | Lombardi et al. |
| 6,129,872 A | 10/2000 | Jang |
| 6,136,948 A | 10/2000 | Dickens, Jr. et al. |
| 6,165,406 A | 12/2000 | Jang et al. |
| 6,175,422 B1 | 1/2001 | Penn et al. |
| 6,228,923 B1 | 5/2001 | Lombardi et al. |
| 6,245,281 B1 | 6/2001 | Scholten et al. |
| 6,572,807 B1 | 6/2003 | Fong |
| 6,645,412 B2 | 11/2003 | Priedeman, Jr. |
| 6,722,872 B1 | 4/2004 | Swanson et al. |
| 6,790,403 B1 | 9/2004 | Priedeman, Jr. et al. |
| 6,814,907 B1 | 11/2004 | Comb |
| 6,869,559 B2 | 3/2005 | Hopkins |
| 6,923,634 B2 | 8/2005 | Swanson et al. |
| 7,077,638 B2 | 7/2006 | Leyden et al. |
| 7,122,246 B2 | 10/2006 | Comb et al. |
| 7,236,166 B2 | 6/2007 | Zinniel et al. |
| 7,255,821 B2 | 8/2007 | Priedeman, Jr. et al. |
| 7,384,255 B2 | 6/2008 | LaBossiere et al. |
| 7,604,470 B2 | 10/2009 | LaBossiere et al. |
| 7,625,200 B2 | 12/2009 | Leavitt |
| 7,648,609 B2 | 1/2010 | Leder et al. |
| 7,754,807 B2 | 7/2010 | Priedeman, Jr. et al. |
| 7,794,647 B1 | 9/2010 | Deckard |
| 7,896,209 B2 | 3/2011 | Batchelder et al. |
| 7,938,351 B2 | 5/2011 | Taatjes et al. |
| 7,938,356 B2 | 5/2011 | Taatjes et al. |
| 8,153,182 B2 | 4/2012 | Comb et al. |
| 8,173,258 B2 | 5/2012 | Monsheimer et al. |
| 8,221,669 B2 | 7/2012 | Batchelder et al. |
| 8,236,227 B2 | 8/2012 | Batchelder et al. |
| 8,246,888 B2 | 8/2012 | Hopkins et al. |
| 2004/0222561 A1 | 11/2004 | Hopkins |
| 2005/0004282 A1 | 1/2005 | Priedeman, Jr. et al. |
| 2005/0129941 A1 | 6/2005 | Comb et al. |
| 2005/0173838 A1 | 8/2005 | Priedeman, Jr. et al. |
| 2008/0213419 A1 | 9/2008 | Skubic et al. |
| 2009/0236775 A1 | 9/2009 | Monsheimer et al. |
| 2009/0274540 A1 | 11/2009 | Batchelder et al. |
| 2010/0010169 A1 | 1/2010 | Tsai et al. |
| 2010/0096072 A1 | 4/2010 | Hopkins et al. |
| 2010/0096485 A1 | 4/2010 | Taatjes et al. |
| 2010/0096489 A1 | 4/2010 | Taatjes et al. |
| 2010/0190005 A1 | 7/2010 | Nair et al. |
| 2010/0283172 A1 | 11/2010 | Swanson |
| 2011/0023986 A1* | 2/2011 | Hoffmann ............... C08L 77/06 138/118 |
| 2011/0033665 A1 | 2/2011 | Montanari et al. |
| 2011/0074065 A1 | 3/2011 | Batchelder et al. |
| 2011/0186081 A1 | 8/2011 | Dunn et al. |
| 2011/0233804 A1 | 9/2011 | Batchelder et al. |
| 2012/0041132 A1 | 2/2012 | Monsheimer et al. |
| 2012/0070523 A1 | 3/2012 | Swanson et al. |
| 2012/0164256 A1 | 6/2012 | Swanson et al. |
| 2012/0231225 A1 | 9/2012 | Mikulak et al. |
| 2012/0259052 A1 | 10/2012 | Nelson et al. |
| 2012/0329932 A1 | 12/2012 | Mathieu et al. |
| 2013/0075957 A1 | 3/2013 | Swanson et al. |

FOREIGN PATENT DOCUMENTS

| | | |
|---|---|---|
| FR | 2854764 | 11/2004 |
| GB | 816016 | 7/1959 |
| JP | 7502299 A | 3/1995 |
| JP | 1997-085839 A | 3/1997 |
| JP | 2005531439 A | 10/2005 |
| JP | 2006-525159 A | 11/2006 |
| JP | 2008505243 A | 2/2008 |
| JP | 2008-507619 A | 3/2008 |
| KR | 10-0712018 B1 | 4/2007 |
| WO | 0020215 | 4/2000 |
| WO | 2010018789 | 2/2010 |
| WO | 2014081594 A1 | 5/2014 |

OTHER PUBLICATIONS

Korean Office Action dated Mar. 31, 2017 for corresponding Korean Application No. 10-2016-7016999, filed Jun. 24, 2016.

* cited by examiner

ADDITIVE MANUFACTURING WITH POLYAMIDE CONSUMABLE MATERIALS

CROSS-REFERENCE TO RELATED APPLICATION(S)

The present application is a continuation-in-part of U.S. patent application Ser. No. 13/833,526, entitled "ADDITIVE MANUFACTURING WITH POLYAMIDE CONSUMABLE MATERIALS", and filed on Mar. 15, 2013; which claims priority to U.S. Provisional Application No. 61/729,043, entitled "ADDITIVE MANUFACTURING WITH POLYAMIDE CONSUMABLE MATERIALS", and filed on Nov. 21, 2012.

BACKGROUND

The present disclosure relates to additive manufacturing systems for printing three-dimensional (3D) parts and support structures. In particular, the present disclosure relates to consumable materials for use in additive manufacturing systems, consumable assemblies retaining the consumable materials, methods of using the consumable materials and assemblies in additive manufacturing systems to print 3D parts, and to the printed 3D parts.

Additive manufacturing systems are used to print or otherwise build 3D parts from digital representations of the 3D parts (e.g., AMF and STL format files) using one or more additive manufacturing techniques. Examples of commercially available additive manufacturing techniques include extrusion-based techniques, jetting, selective laser sintering, powder/binder jetting, electron-beam melting, and stereolithographic processes. For each of these techniques, the digital representation of the 3D part is initially sliced into multiple horizontal layers. For each sliced layer, a tool path is then generated, which provides instructions for the particular additive manufacturing system to print the given layer.

For example, in an extrusion-based additive manufacturing system, a 3D part may be printed from a digital representation of the 3D part in a layer-by-layer manner by extruding a flowable part material. The part material is extruded through an extrusion tip carried by a print head of the system, and is deposited as a sequence of roads on a substrate in an x-y plane. The extruded part material fuses to previously deposited part material, and solidifies upon a drop in temperature. The position of the print head relative to the substrate is then incremented along a z-axis (perpendicular to the x-y plane), and the process is then repeated to form a 3D part resembling the digital representation.

In fabricating 3D parts by depositing layers of a part material, supporting layers or structures are typically built underneath overhanging portions or in cavities of 3D parts under construction, which are not supported by the part material itself. A support structure may be built utilizing the same deposition techniques by which the part material is deposited. The host computer generates additional geometry acting as a support structure for the overhanging or free-space segments of the 3D part being formed. Support material is then deposited from a second nozzle pursuant to the generated geometry during the printing process. The support material adheres to the part material during fabrication, and is removable from the completed 3D part when the printing process is complete.

SUMMARY

An aspect of the present disclosure is directed to a method for printing a 3D part with an additive manufacturing system. The method includes providing a consumable material having a polyamide blend comprising at least one semi-crystalline polyamide and at least one amorphous polyamide that is substantially miscible with the at least one semi-crystalline polyamide. The consumable material is preferably capable of printing 3D parts having good part strengths and ductilities, and low curl. The method also includes heating a chamber of the additive manufacturing system (or at least locally heating a deposition region) to one or more elevated temperatures, feeding the consumable material to a liquefier assembly, melting the consumable material in the liquefier assembly, and extruding the molten consumable material from the liquefier assembly as a series of roads in the heated chamber (or the locally-heated deposition region) to print the 3D part in a layer-by-layer manner.

Another aspect of the present disclosure is directed to a consumable material for use in an additive manufacturing system. The consumable material includes a polyamide blend and has a physical geometry configured to be received by the additive manufacturing system for printing a 3D part from the consumable material in a layer-by-layer manner using an additive manufacturing technique. In some embodiments, the polyamide blend includes at least one semi-crystalline polyamide and at least one amorphous polyamide that is substantially miscible with the at least one semi-crystalline polyamide, and is preferably capable of printing 3D parts having good part strengths and ductilities, and low curl. In some further embodiments, the polyamide blend includes a semi-crystalline polyamide (e.g., polycarpolactum (PA6)) having an aliphatic backbone grafted with an impact modifier pendant chain, and an amorphous polyamide (e.g., a polyamide of trimethylhexamethylenediamine and terephthalic acid (PA6/3T)) having an amorphous backbone, where the PA6/3T amorphous polyamide constitutes from about 30% by weight to about 70% by weight of the polyamide blend. In some preferred alternative embodiments, the polyamide blend includes a PA12 semi-crystalline polyamide having an aliphatic/cycloaliphatic backbone grafted with an impact modifier pendant chain, and an amorphous PA12 polyamide having an amorphous backbone, where the PA12 amorphous polyamide constitutes from about 50% by weight to about 85% by weight of the polyamide blend.

Another aspect of the present disclosure is directed to a consumable assembly for use in an extrusion-based additive manufacturing system. The consumable assembly includes a container portion and a consumable filament at least partially retained by the container portion. The consumable filament includes a polyamide blend having at least one semi-crystalline polyamide, and at least one amorphous polyamide that is substantially miscible with the at least one semi-crystalline polyamide, and is preferably capable of printing 3D parts having good part strengths and ductilities, and low curl. The consumable filament also has a filament geometry configured to be received by the additive manufacturing system for printing a 3D part from the consumable material in a layer-by-layer manner using an additive manufacturing technique.

Another aspect of the present disclosure is directed to a 3D part printed with an additive manufacturing system from a consumable material that includes a polyamide blend having at least one semi-crystalline polyamide, and at least one amorphous polyamide that is substantially miscible with the at least one semi-crystalline polyamide. The 3D part preferably has good part strength and ductility, and low curl.

DEFINITIONS

Unless otherwise specified, the following terms as used herein have the meanings provided below:

The term "semi-crystalline polyamide" refers to a polyamide capable of exhibiting an average percent crystallinity in a solid state of at least about 10% by weight. The term "semi-crystalline polymeric material" includes polymeric materials having crystallinities up to 100% (i.e., fully-crystalline polymeric materials). The term "amorphous polyamide" refers to a polyamide that is not a semi-crystalline polyamide.

The terms "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the present disclosure.

Reference to "a" chemical compound refers one or more molecules of the chemical compound, rather than being limited to a single molecule of the chemical compound. Furthermore, the one or more molecules may or may not be identical, so long as they fall under the category of the chemical compound. Thus, for example, "a" polyamide is interpreted to include one or more polymer molecules of the polyamide, where the polymer molecules may or may not be identical (e.g., different molecular weights and/or isomers).

The terms "at least one" and "one or more of" an element are used interchangeably, and have the same meaning that includes a single element and a plurality of the elements, and may also be represented by the suffix "(s)" at the end of the element. For example, "at least one polyamide", "one or more polyamides", and "polyamide(s)" may be used interchangeably and have the same meaning.

Directional orientations such as "above", "below", "top", "bottom", and the like are made with reference to a layer-printing direction of a 3D part. In the embodiments shown below, the layer-printing direction is the upward direction along the vertical z-axis. In these embodiments, the terms "above", "below", "top", "bottom", and the like are based on the vertical z-axis. However, in embodiments in which the layers of 3D parts are printed along a different axis, such as along a horizontal x-axis or y-axis, the terms "above", "below", "top", "bottom", and the like are relative to the given axis.

Unless otherwise specified, characteristics of a material or a 3D part printed from the material refer to the characteristics as measured parallel to the orientation of the 3D part layers and perpendicular to the layer-printing direction, and is referred to as an "xy-direction". Correspondingly, the term "z-direction", with reference to characteristics of a material or a 3D part printed from the material refer to the characteristics as measured perpendicular to the orientation of the 3D part layers and parallel to the layer-printing direction. Unless the measurement direction is specified as "in the z-direction", a measurement referred to herein is taken in the xy-direction. For example, a tensile strength of a 3D part of 10,000 psi refers to a tensile strength measured parallel to the layers of the 3D part. Alternatively, a tensile strength of a 3D part in the z-direction of 8,000 psi refers to a tensile strength measured perpendicular to the layers of the 3D part.

Unless otherwise specified, temperatures referred to herein are based on atmospheric pressure (i.e. one atmosphere).

The term "providing", such as for "providing a consumable material", when recited in the claims, is not intended to require any particular delivery or receipt of the provided item. Rather, the term "providing" is merely used to recite items that will be referred to in subsequent elements of the claim(s), for purposes of clarity and ease of readability.

The terms "about" and "substantially" are used herein with respect to measurable values and ranges due to expected variations known to those skilled in the art (e.g., limitations and variabilities in measurements).

DETAILED DESCRIPTION

Figure 1:
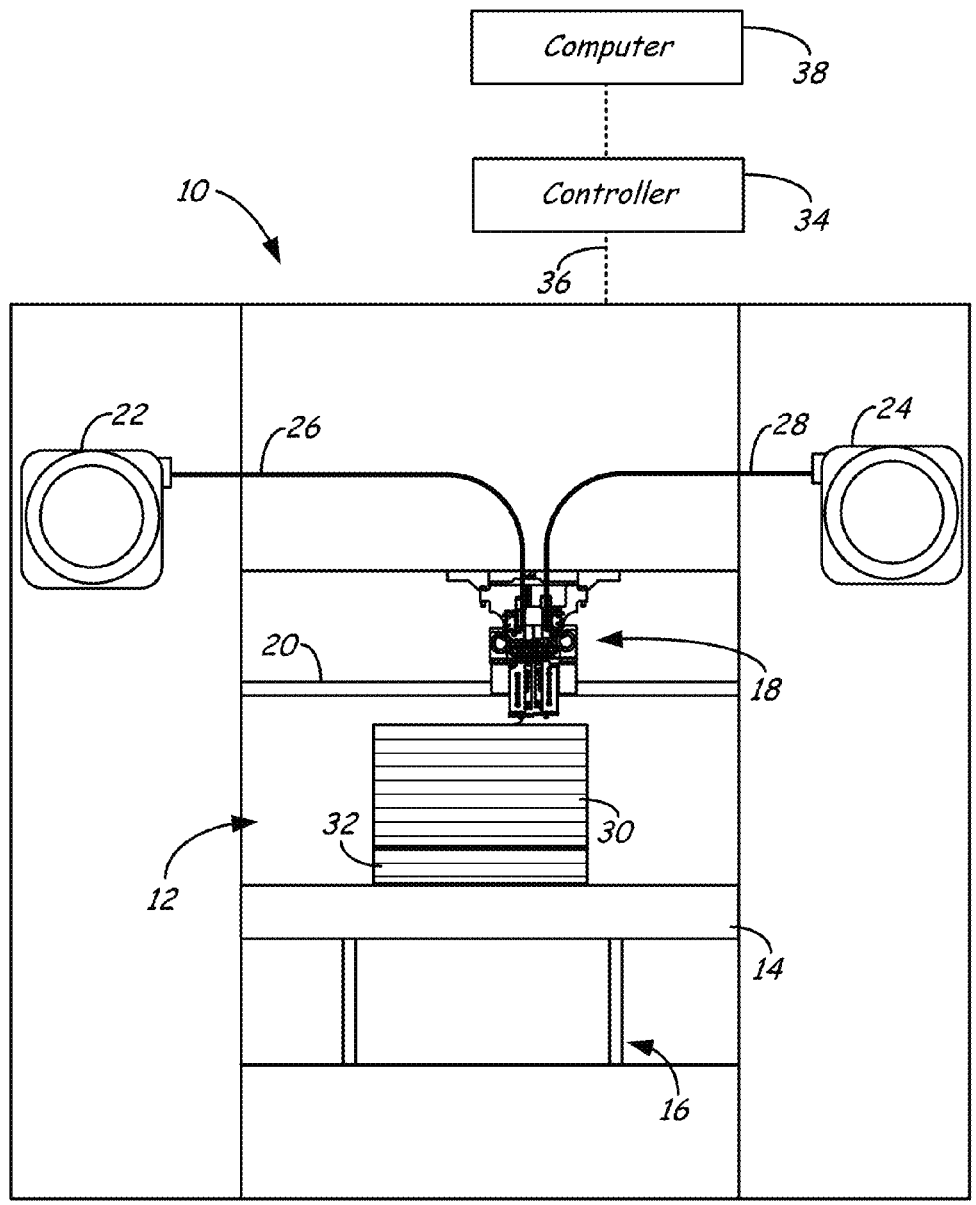
FIG. 1 is a front view of an additive manufacturing system configured to print 3D parts from a polyamide material of the present disclosure.

The present disclosure is directed to a polyamide (PA) part material for printing 3D parts in additive manufacturing systems, such as extrusion-based additive manufacturing systems. The PA material compositionally includes a blend of one or more semi-crystalline polyamides and one or more amorphous polyamides, where the semi-crystalline polyamide(s) and the amorphous polyamide(s) are preferably selected and blended at a ratio in which they are substantially miscible with each other.

The substantially miscible blend may exhibit a co-continuous phase of the semi-crystalline polyamide(s) and the amorphous polyamide(s), or more preferably a single continuous phase of the semi-crystalline polyamide(s) and the amorphous polyamide(s), which has been found to produce 3D parts having good strengths and ductilities. As such, the 3D parts are suitable for use in a variety of industrial and commercial applications. Furthermore, it has been found that this same miscibility window also surprising encompasses a range where curl of the printed 3D parts can be controlled and reduced. Thus, the strong and ductile 3D parts may also be printed in a dimensionally-stable manner.

The PA material preferably has a physical geometry configured to be received by the additive manufacturing system for printing a 3D part from the PA material in a layer-by-layer manner using an additive manufacturing technique. For example, the PA material may have a geometry configured to be received by an extrusion-based additive manufacturing system (e.g., a filament geometry).

Extrusion-based additive manufacturing systems typically print or otherwise build 3D parts from amorphous polymeric materials, such as acrylonitrile-butadiene-styrene (ABS) resins and polycarbonate resins. During a printing operation, the amorphous polymeric material is melted and extruded as a series of roads, which cool down to form layers of a 3D part. Due to the layer-by-layer nature of the printing, the cooling of each successive layer generates residual stresses in the 3D part, which are a function of the coefficient of thermal expansion, percent shrinkage, and tensile modulus of the material. If not relieved, the residual stresses may physically distort the 3D part, such as by causing the edges and corners of the 3D part to curl up, referred to as "curl" or "curling".

Amorphous polymeric materials have little or no ordered arrangements of their polymer chains in their solid states. As such, these materials exhibit glass transition effects that can be controlled to partially relieve residual stresses. For example, as disclosed in Batchelder, U.S. Pat. No. 5,866,058, an amorphous polymeric material may be deposited into a heated chamber (or at least a locally-heat deposition region) maintained at a temperature that is between a solidification temperature and a glass transition temperature of the material. This anneals the successively-printed printed layers, allowing them to cool down and solidify slowly, which can partially relieve the residual stresses.

Semi-crystalline polymeric materials, such as semi-crystalline polyamides, however, have different mechanical and thermal characteristics from amorphous polymeric materials. For example, due to their crystallinity, 3D parts printed with semi-crystalline polymeric materials may exhibit superior mechanical properties compared to 3D parts printed with amorphous polymeric materials. However, due to their higher levels of crystallinity, semi-crystalline polymeric materials exhibit discontinuous changes in volume upon solidification. Therefore, layers of a semi-crystalline polymeric material may contract and shrink when deposited, thereby accumulating residual stresses.

In comparison to amorphous polymeric materials, which can have relatively broad annealing windows, it is difficult to maintain a temperature window that is suitable for annealing semi-crystalline polymers (e.g., semi-crystalline polyamides), particularly with extrusion-based additive manufacturing systems. Any variations outside of this small temperature window will result in solidification with discontinuous changes in volume (if below the temperature window) or sagging of the extruded roads (if above the temperature window). Each of these conditions may result in distortions of the printed 3D part.

The PA material of the present disclosure, however, is suitable for printing 3D parts having mechanical properties (e.g., strengths and ductilities) similar to those of semi-crystalline polyamides, while also being annealable in a heated chamber of an additive manufacturing system (or at least a locally-heated deposition region) to partially relieve residual stresses. Additionally, the PA material is capable of forming strong interfacial bonds with acid-based support materials, allowing support structures to anchor and further relieve the residual stresses. These capabilities can contribute to a reduction in curl for resulting 3D parts.

As shown in FIG. 1, system 10 is an additive manufacturing system for printing or otherwise building 3D parts and support structures using a layer-based, additive manufacturing technique, where the 3D parts may be printed from the PA material of the present disclosure. Suitable additive manufacturing systems for system 10 include extrusion-based additive manufacturing systems developed by Stratasys, Inc., Eden Prairie, Minn. under the trademarks "FDM" and "FUSED DEPOSITION MODELING".

In the shown embodiment, system 10 includes chamber 12, platen 14, platen gantry 16, print head 18, head gantry 20, and consumable assemblies 22 and 24. Chamber 12 is an enclosed environment that contains platen 14 for printing 3D parts and support structures. Chamber 12 may be heated (e.g., with circulating heated air) to reduce the rate at which the part and support materials solidify after being extruded and deposited. Alternatively, the heating may be localized rather than in an entire chamber 12. For example, the deposition region may be heated in a localized manner. Example techniques for locally-heating a deposition region include heating platen 14 and/or with directing heat air jets towards platen 14 and/or the 3D parts/support structures being printed). As discussed above, the heating anneals the printed layers of the 3D parts (and support structures) to partially relieve the residual stresses, thereby reducing curling of the 3D parts. In alternative embodiments, chamber 12 may be omitted and/or replaced with different types of build environments. For example, a 3D part and support structure may be printed in a build environment that is open to ambient conditions or may be enclosed with alternative structures (e.g., flexible curtains).

Platen 14 is a platform on which 3D parts and support structures are printed in a layer-by-layer manner. In some embodiments, platen 14 may also include a flexible polymeric film or liner on which the 3D parts and support structures are printed. In the shown example, print head 18 is a dual-tip extrusion head configured to receive consumable filaments from consumable assemblies 22 and 24 (e.g., via guide tubes 26 and 28) for printing 3D part 30 and support structure 32 on platen 14. Consumable assembly 22 may contain a supply of the PA material for printing 3D part 30 from the PA material. Consumable assembly 24 may contain a supply of a support material for printing support structure 32 from the given support material.

Platen 14 is supported by platen gantry 16, which is a gantry assembly configured to move platen 14 along (or substantially along) a vertical z-axis. Correspondingly, print head 18 is supported by head gantry 20, which is a gantry assembly configured to move print head 18 in (or substantially in) a horizontal x-y plane above chamber 12.

In an alternative embodiment, platen 14 may be configured to move in the horizontal x-y plane within chamber 12, and print head 18 may be configured to move along the z-axis. Other similar arrangements may also be used such that one or both of platen 14 and print head 18 are moveable relative to each other. Platen 14 and print head 18 may also be oriented along different axes. For example, platen 14 may be oriented vertically and print head 18 may print 3D part 30 and support structure 32 along the x-axis or the y-axis.

System 10 also includes controller 34, which is one or more control circuits configured to monitor and operate the components of system 10. For example, one or more of the control functions performed by controller 34 can be implemented in hardware, software, firmware, and the like, or a combination thereof. Controller 34 may communicate over communication line 36 with chamber 12 (e.g., with a heating unit for chamber 12), print head 18, and various sensors, calibration devices, display devices, and/or user input devices.

In some embodiments, controller 34 may also communicate with one or more of platen 14, platen gantry 16, head gantry 20, and any other suitable component of system 10. While illustrated as a single signal line, communication line 36 may include one or more electrical, optical, and/or wireless signal lines, allowing controller 34 to communicate with various components of system 10. Furthermore, while illustrated outside of system 10, controller 34 and communication line 36 may be internal components to system 10.

System 12 and/or controller 34 may also communicate with computer 38, which is one or more computer-based systems that communicates with system 12 and/or controller 34, and may be separate from system 12, or alternatively may be an internal component of system 12. Computer 38 includes computer-based hardware, such as data storage devices, processors, memory modules and the like for generating and storing tool path and related printing instructions. Computer 38 may transmit these instructions to system 10 (e.g., to controller 34) to perform printing operations.

Figure 2:
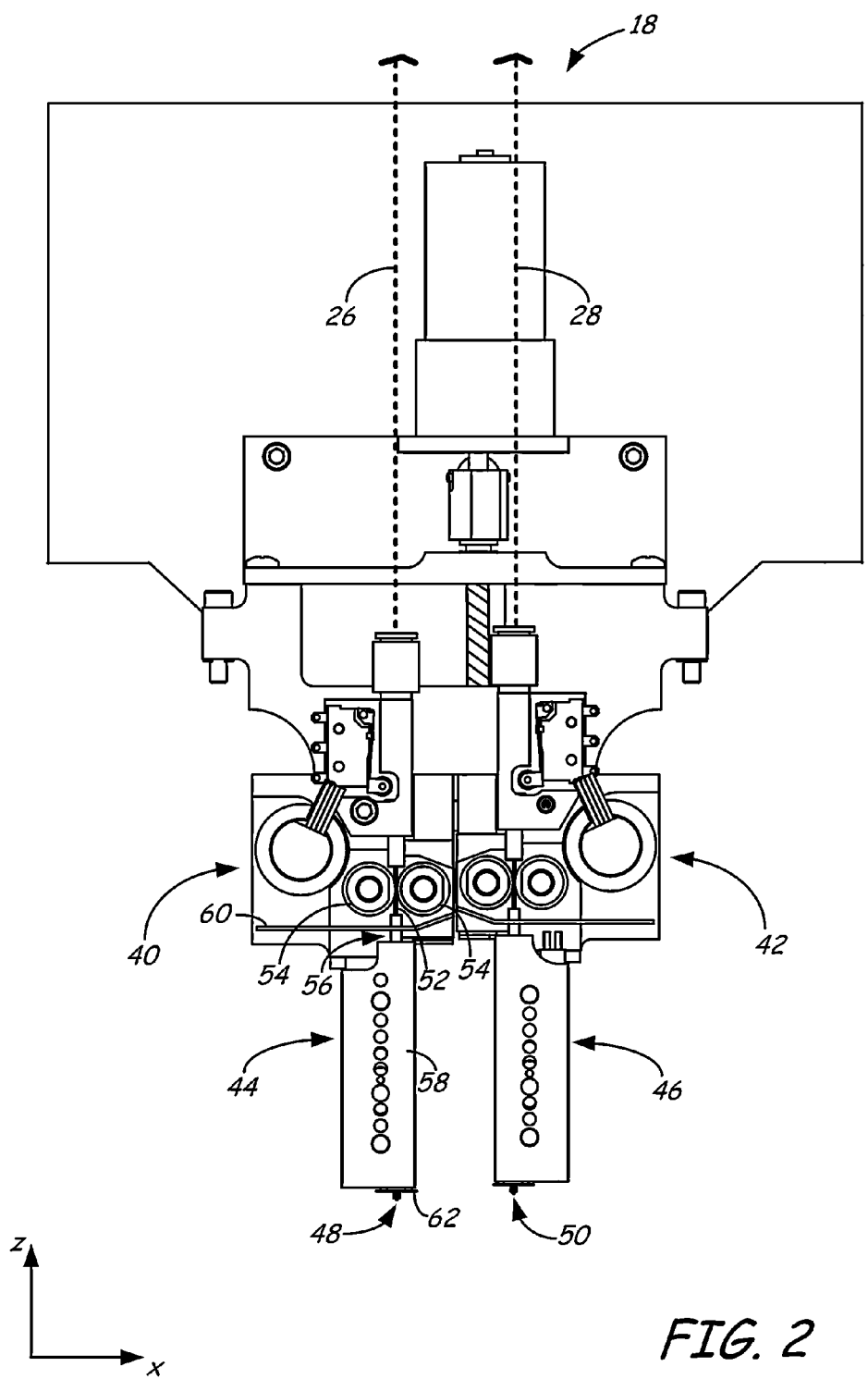
FIG. 2 is a front view of a print head of the additive manufacturing system.

FIG. 2 illustrates a suitable device for print head 18, as described in Leavitt, U.S. Pat. No. 7,625,200. Additional examples of suitable devices for print head 18, and the connections between print head 18 and head gantry 20 include those disclosed in Crump et al., U.S. Pat. No. 5,503,785; Swanson et al., U.S. Pat. No. 6,004,124; LaBossiere, et al., U.S. Pat. Nos. 7,384,255 and 7,604,470; Batchelder et al., U.S. Pat. No. 7,896,209; and Comb et al., U.S. Pat. No. 8,153,182. In additional embodiments, in which print head 18 is an interchangeable, single-nozzle print head, examples of suitable devices for each print head 18, and the connections between print head 18 and head gantry 20 include those disclosed in Swanson et al., U.S. Patent Application Publication No. 2012/0164256.

Figure 3:
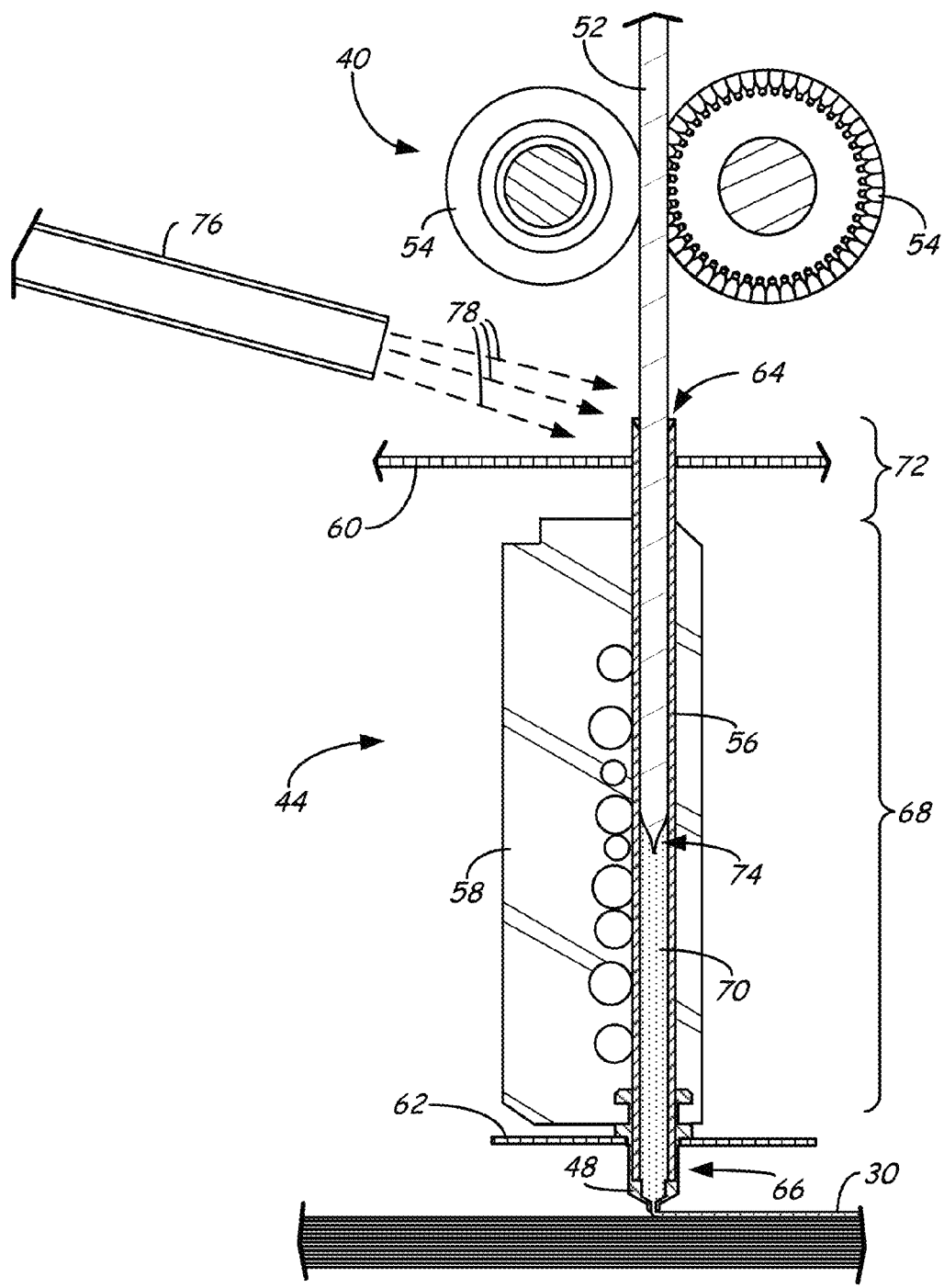
FIG. 3 is an expanded sectional view of a drive mechanism, a liquefier assembly, and a nozzle of the print head.

In the shown dual-tip embodiment, print head 18 includes two drive mechanism 40 and 42, two liquefier assemblies 44 and 46, and two nozzles 48 and 50. In this embodiment the PA material and the support material each preferably have a filament geometry for use with print head 18. For example, as best shown in FIG. 3, the PA material may be provided as filament 52.

During operation, controller 34 may direct wheels 54 of drive mechanism 40 to selectively draw successive segments filament 52 from consumable assembly 22 (via guide tube 26), and feed filament 52 to liquefier assembly 44. Liquefier assembly 44 may include liquefier tube 56, thermal block 58, heat shield 60, and tip shield 62, where liquefier tube 56 includes inlet end 64 for receiving the fed filament 52. Nozzle 48 and tip shield 62 are accordingly secured to outlet end 66 of liquefier tube 56, and liquefier tube 56 extends through thermal block 58 and heat shield 60.

While liquefier assembly 44 is in its active state, thermal block 58 heats liquefier tube 56 to define heating zone 68. The heating of liquefier tube 56 at heating zone 68 melts the PA material of filament 52 in liquefier tube 56 to form melt 70. The upper region of liquefier tube 56 above heating zone 68, referred to as transition zone 72, is not directly heated by thermal block 58. This generates a thermal gradient or profile along the longitudinal length of liquefier tube 56.

The molten portion of the PA material (i.e., melt 70) forms meniscus 74 around the unmelted portion of filament 52. During an extrusion of melt 70 through nozzle 48, the downward movement of filament 52 functions as a viscosity pump to extrude the PA material of melt 70 out of nozzle 48 as extruded roads to print 3D part 30 in a layer-by-layer manner. While thermal block 58 heats liquefier tube 56 at heating zone 68, cooling air may also be blown through a manifold 76 toward inlet end 64 of liquefier tube 56, as depicted by arrows 78. Heat shield 60 assists in directing the air flow toward inlet end 64. The cooling air reduces the temperature of liquefier tube 56 at inlet end 64, which prevents filament 52 from softening or melting at transition zone 72.

In some embodiments, controller 34 may servo or swap liquefier assemblies 44 and 46 between opposing active and stand-by states. For example, while liquefier assembly 46 is servoed to its active state for extruding the support material to print a layer of support structure 32, liquefier assembly 44 is switched to a stand-by state to prevent the PA material from being extruded while liquefier assembly 46 is being used. After a given layer of the support material is completed, controller 34 then servoes liquefier assembly 46 to its stand-by state, and switches liquefier assembly 44 to its active state for extruding the PA material to print a layer of 3D part 30. This servo process may be repeated for each printed layer until 3D part 30 and support structure 32 are completed.

While liquefier assembly 46 is in its active state for printing support structure 32 from a support material filament, drive mechanism 42, liquefier assembly 46, and nozzle 50 (each shown in FIG. 2) may operate in the same manner as drive mechanism 40, liquefier assembly 44, and nozzle 48 for extruding the support material. In particular, drive mechanism 40 may draw successive segments of the support material filament from consumable assembly 24 (via guide tube 28), and feed the support material filament to liquefier assembly 46. Liquefier assembly 46 thermally melts the successive segments of the received support material filament such that it becomes a molten support material. The molten support material may then be extruded and deposited from nozzle 50 as a series of roads onto platen 14 for printing support structure 32 in a layer-by-layer manner in coordination with the printing of 3D part 30.

After the print operation is complete, the resulting 3D part 30 and support structure 32 may be removed from chamber 12, and support structure 32 may be removed from 3D part 30. As discussed below, the PA material is capable of forming strong interfacial bonds with acid-based support materials, which can anchor and assist in relieving residual stresses in 3D part 30. However, the strong interfacial bond also increases the difficulty in breaking support structure 32 apart from 3D part 30 without damaging 3D part 30. Instead, as also discussed below, the acid-based support material is preferably a soluble support material, such as a water or alkaline solution-soluble support material. In this embodiment, support structure 32 may be removed from 3D part 30 by immersing the printed 3D part 30/support structure 32 in an aqueous solution bath (e.g., an alkaline solution bath) to at least partially dissolve support structure 32.

In alternative embodiments, the PA material of the present disclosure may be provided in powder or pellet form for use in an auger-pump print head, such as disclosed in Bosveld et al., U.S. Publication No. 13/525,793. Moreover, the PA material may be provided in powder form for use in other powder-based additive manufacturing systems, such as selective laser sintering systems (e.g., systems disclosed in Deckard, U.S. Pat. Nos. 4,863,538 and 5,132,143), powder/binder systems (e.g., systems disclosed in Sachs et al., U.S. Pat. No. 5,204,055), sand casting systems, electron-beam systems, and the like. Additional systems for the embodiment include those disclosed in Mannella et al., U.S. Pat. No. 8,221,858. In these embodiments, the PA material is also preferably pelletized or otherwise micronized and/or classified to attain desired powder particle sizes for use in the particular system.

In further alternative embodiments, the PA material of the present disclosure may be provided in powder form for use in an electrophotography-based additive manufacturing system, such as those disclosed in Hanson et al., U.S. Publication Nos. 2013/0077996 and 2013/0077997, and Comb et al., U.S. Publication Nos. 2013/0186549 and 2013/0186558, the disclosures of which are incorporated by reference to the extent that they do not conflict with the present disclosure.

As mentioned above, the PA material of the present disclosure compositionally includes a polyamide blend of one or more semi-crystalline polyamides and one or more amorphous polyamides, as defined above. In some embodiments, the amorphous polyamide(s) have substantially no measurable melting points (less than 5 calories/gram) using differential scanning calorimetry (DSC) pursuant to ASTM D3418-08. Correspondingly, in these embodiments, the semi-crystalline polyamide(s) have measurable melting points (5 calories/gram or more) using DSC pursuant to ASTM D3418-08. As discussed below, the PA material may also optionally include one or more additives dispersed in the polyamide blend.

The semi-crystalline polyamide(s) may include polyamide homopolymers and copolymers derived from monomers that include caprolactam, diamines in combination with monomers that include dicarboxylic acids, and mixtures thereof. The diamine monomers and the dicarboxylic acid monomers are each preferably aliphatic monomers, and more preferably are each acyclic aliphatic monomers. However, in other embodiments, the diamine monomers and/or the dicarboxylic acid monomers may include aromatic or cycloaliphatic groups while maintaining crystalline domains. Furthermore, in some embodiments, the semi-crystalline polyamide(s) may include cyclic groups in grafted pendant chains (e.g., maleated groups), as discussed below. Preferred polyamide homopolymers and copolymers for the semi-crystalline polyamide(s) may be represented by the following structural formulas:

$$-[NH-R_1-\overset{O}{\overset{\|}{C}}]_n-$$ (Formula 1)

$$-[NH-R_2-NH-\overset{O}{\overset{\|}{C}}-R_3-\overset{O}{\overset{\|}{C}}]_n-$$ (Formula 2)

where $R_1$, $R_2$, and $R_3$ may each be a hydrocarbon chain having 3-12 carbon atoms. The hydrocarbon chains for $R_1$, $R_2$, and $R_3$ may be branched (e.g., having small alkyl groups, such as methyl groups) or unbranched, and which are preferably aliphatic, acyclic, saturated hydrocarbon chains.

As used herein, reference to a repeating unit identifier "n" in a polymer structural formula means that the bracketed formula repeats for n units, where n is a whole number that may vary depending on the molecular weight of the given polymer. Furthermore, the particular structures of the bracketed formulas may be the same between the repeating units (i.e., a homopolymer) or may be vary between the repeating units (i.e., copolymer). For example, in the above-shown Formula 1, $R_1$ may be the same structure for each repeating unit to provide a homopolymer, or may be two or more different structures that repeat in an alternating copolymer manner, a random copolymer manner, a block copolymer manner, a graft copolymer manner (as discussed below), or combinations thereof.

Preferred polyamides for the semi-crystalline polyamide(s) include nylon-type materials such as polycarpolactum (PA6), polyhexamethyleneadipamide (PA6,6), polyhexamethylenenonamide (PA6,9), polyhexamethylenesebacamide (PA6,10), polyenantholactum (PA7), polyundecanolactum (PA11), polylaurolactam (PA12), and mixtures thereof. More preferably, the polyamides for the semi-crystalline polyamide(s) include PA6; PA6,6; and mixtures thereof. Examples of suitable semi-crystalline polyamide(s) having aromatic groups include semi-crystalline polyamides of aliphatic diamines and isophthalic acid and/or terephthalic acid (e.g., semi-crystalline polyphthalamides).

Furthermore, in some preferred embodiments, at least a portion of the semi-crystalline polyamide(s) are graft semi-crystalline polyamide(s), each having a polyamide backbone and one or more impact modifiers grafted to the backbone. The impact modifiers may include polyolefin-chain monomers and/or elastomers having coupling groups configured to graft the monomers to the polyamide backbone. Suitable coupling groups for the impact modifiers include piperidine groups, acrylic/methacrylic acid groups, maleic anhydride groups, epoxy groups.

Preferred coupling groups include maleic anhydride groups and epoxy groups, such as those respectively represented by the following structural formulas:

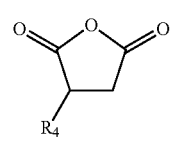 (Formula 3)

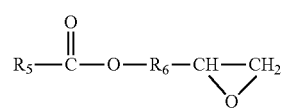 (Formula 4)

where $R_4$ and $R_5$ may each be a hydrocarbon chain having 2-20 carbon atoms, and more preferably 2-10 carbon atoms; and where $R_6$ may be a hydrocarbon chain having 1-4 carbon atoms. The hydrocarbon chains of $R_4$, $R_5$, and R6 may each be branched or unbranched. For example, preferred impact modifiers include maleated polyethylenes, maleated polypropylenes, and mixtures thereof. In embodiments in which the impact modifier includes an elastomer, preferred impact modifiers include maleated ethylene propylene diene monomers (EPDM).

Examples of suitable commercial impact modifiers include those available under the tradenames LOTADER from Arkema Inc., Philadelphia, Pa.; those under the tradename ELVALOY PTW, FUSABOND N Series, and NUCREL from E. I. du Pont de Nemours and Company, Wilmington, Del.; and those under the tradename ROYALTURF from Chemtura Corporation, Philadelphia, Pa. Examples of preferred graft semi-crystalline polyamides include those commercially available under the tradename ULTRAMID from BASF Corporation, Florham Park, N.J.; and those under the tradename GRILAMID from EMS-Chemie, Inc., Sumter, S.C. (business unit of EMS-Grivory).

The grafted impact modifiers may constitute from about 1% to about 20% by weight of the graft semi-crystalline polyamide(s). In some embodiments, the grafted impact modifiers constitute from about 5% to about 15% by weight of the graft semi-crystalline polyamide(s). In embodiments that incorporate the graft semi-crystalline polyamide(s), the graft semi-crystalline polyamide(s) may constitute from about 50% to 100% by weight of the semi-crystalline polyamide(s) in the PA material, more preferably from about 80% to 100% by weight, and even more preferably from about 95% to 100% by weight. In some preferred embodiments, the semi-crystalline polyamide(s) of the PA material consist essentially of the graft semi-crystalline polyamide(s).

The semi-crystalline polyamide(s) preferably have a molecular weight range that renders them suitable for extrusion from print head 18, which may be characterized by their melt flow indices. Preferred melt flow indices for the semi-crystalline polyamide(s) range from about 1 gram/10 minutes to about 40 grams/10 minutes, more preferably from about 3 grams/10 minutes to about 20 grams/10 minutes, and even more preferably from about 5 grams/10 minutes to about 10 grams/10 minutes where the melt flow index, as used herein, is measured pursuant to ASTM D1238-10 with a 2.16 kilogram weight at a temperature of 260° C.

The PA material also compositionally includes one or more amorphous polyamides that are preferably miscible with the semi-crystalline polyamide(s). The amorphous polyamide(s) may include polyamide homopolymers and copolymers derived from monomers that include diamines in combination with monomers that include dicarboxylic acids, which are preferably cycloaliphatic and/or aromatic monomers. However, in other embodiments, the diamine monomers and/or the dicarboxylic acid monomers may include aliphatic groups (e.g., acyclic aliphatic groups) while maintaining amorphous properties.

Preferred polyamide homopolymers and copolymers for the amorphous polyamide(s) may be represented by the following structural formulas:

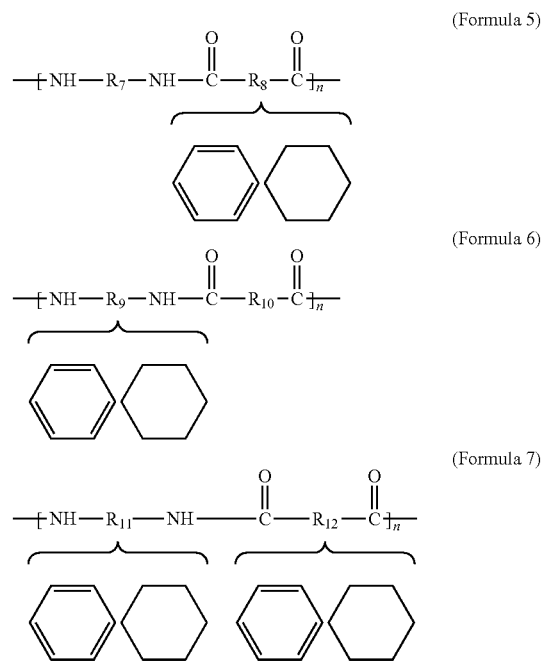

(Formula 5)

(Formula 6)

(Formula 7)

where $R_7$ and $R_{10}$ may each be a hydrocarbon chain having 3-12 carbon atoms. The hydrocarbon chains for $R_7$ and $R_{10}$ may be branched (e.g., having small alkyl groups, such as methyl groups) or unbranched, and which are preferably aliphatic, acyclic, saturated hydrocarbon chains. In comparison, $R_8$, $R_9$, $R_{11}$, and $R_{12}$ may each be a hydrocarbon chain having 5-20 carbon atoms, which may be branched (e.g., having alkyl groups, such as methyl groups) or unbranched, and each of which includes one or more aromatic groups (e.g., benzene groups), one or more cycloaliphatic groups (e.g., cyclohexane groups), or combinations thereof.

Preferred polyamides for the amorphous polyamide(s) include nylon-type materials such as polyamides of hexamethylenediamine, isophthalic acid, terephthalic acid, and adipic acid (PA6i/6T); polyamides of PA12; 3,3-dimethyl-4,4-diaminodicyclohexylmethane, and isophthalic acid (PA12/MACMI); polyamides of PA12; 3,3-dimethyl-4,4-diaminodicyclohexylmethane, and terephthalic acid (PA12/MACMT); (PA12/MACMI/MACMT); PA6i; PA12/MACM36; PANDT/INDT; polyamides of trimethylhexamethylenediamine and terephthalic acid (PA6/3T); polyamides of cycloaliphaticdiamine and dodecanedioic acid; amorphous polyamides of aliphatic diamines and isophthalic acid and/or terephthalic acid (e.g., amorphous polyphthalamides); and mixtures thereof.

More preferably, the polyamides for the amorphous polyamide(s) include PA6/3T, polyamides of cycloaliphaticdiamine and dodecanedioic acid, and mixtures thereof. Examples of suitable commercial amorphous polyamides include those available under the tradename TROGAMID from Evonik Industries AG, Germany; those under the tradename ZYTEL from E. I. du Pont de Nemours and Company, Wilmington, Del.; and those under the tradename GRILAMID TR from EMS-Chemie, Inc., Sumter, S.C. (business unit of EMS-Grivory).

In some embodiments, at least a portion of the amorphous polyamide(s) may be graft amorphous polyamide(s), each having a polyamide backbone and one or more impact modifiers grafted to the backbone. Preferred impact modifiers for grafting to the amorphous polyamide(s) include those discussed above for the graft semi-crystalline polyamide(s), such as polyolefin-chain monomers and/or elastomers having coupling groups configured to graft the monomers to the polyamide backbone (e.g., piperidine groups, acrylic/methacrylic acid groups, maleic anhydride groups, and epoxy groups). Suitable concentrations of the grafted impact modifiers in the graft amorphous polyamide(s), and suitable concentrations of the graft amorphous polyamides relative to the entirety of amorphous polyamide(s) in the PA material include those discussed above for the graft semi-crystalline polyamide(s).

It has been found that grafting impact modifiers to the semi-crystalline polyamide(s) and the amorphous polyamide(s) reduces friction of filament 52 while being fed through inlet opening 64 and transition zone 72 of liquefier tube 56. Otherwise, filament 52 may become stuck within transition zone 72, potentially causing filament 52 to buckle, mushroom, or slip from wheels 54 of drive mechanism 40. As can be appreciated, these issues can impair the printing of 3D part 30.

Furthermore, grafting the same impact modifier (or the same impact modifiers) to the semi-crystalline polyamide(s) and the amorphous polyamide(s) is found to increase the miscibility window and compatibilization of the polyamides. For example, the semi-crystalline polyamide(s) and the amorphous polyamide(s) may form a block copolymer via the impact modifier, which can provide compatibilization of the entire system by sitting at the co-continuous phase interface. As such, in some preferred embodiments, the graft semi-crystalline polyamide(s) and the graft amorphous polyamide(s) include the same grafted impact modifier(s).

The amorphous polyamide(s) also preferably have a molecular weight range that renders them suitable for extrusion from print head 18, which may be characterized by their melt flow indices. Preferred melt flow indices for the amorphous polyamide(s) range from about 1 gram/10 minutes to about 30 grams/10 minutes, and more preferably from about 1 gram/10 minutes to about 15 grams/10 minutes.

Figure 4:
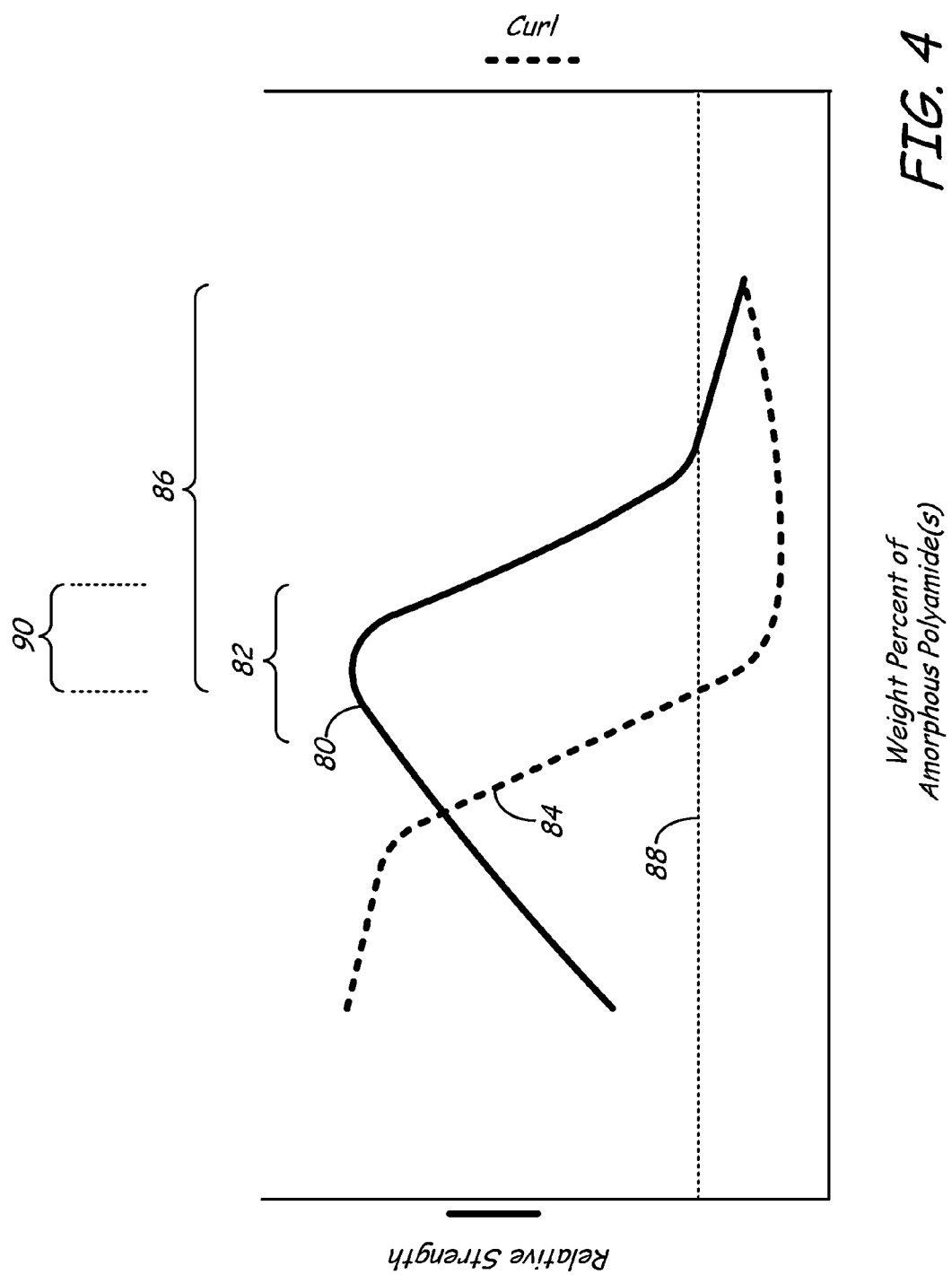
FIG. 4 is a graphical illustration of plots of relative strength and curl versus a polyamide blend ratio of the polyamide material, where the curl plot is based on a base-10 logarithmic scale.

As mentioned above, the semi-crystalline polyamide(s) and the amorphous polyamide(s) are preferably selected and blended at a ratio in which they are substantially miscible with each other to produce 3D parts (e.g., 3D part 30) having good strengths and ductilities. For example, FIG. 4 illustrates plot lines of relative strength and curl for an example PA material of the present disclosure relative to the concentration of amorphous polyamide(s) in the polyamide blend (the semi-crystalline polyamide(s) constitute the remainder of the polyamide blend).

The term "relative strength", as used herein, refers to a product of the tensile strength of the PA material and the percent elongation at break for the PA material, as shown below in Equation 1:

Relative Strength=(Tensile Strength)(%Elongation at Break/100)  (Equation 1)

where the tensile strength and the percent elongation at break are each measured pursuant to ASTM D638-10. Accordingly, the relative strength of the PA material combines part strength and ductility measurements, and is a good indicator for the robustness, fatigue life, and allowables of printed 3D parts.

As shown in FIG. 4, a plot of the relative strength of the PA material versus the concentration of the amorphous polyamide(s) in the polyamide blend (referred to as plot line 80) illustrates that the relative strength of the PA material peaks within a concentration range 82 of the amorphous polyamide(s) in the polyamide blend. While not wishing to be bound by theory, this peak range 82 is believed to be the result of the miscibility of the semi-crystalline polyamide(s) and the amorphous polyamide(s). In other words peak range 82 generally corresponds to the miscibility window of the polyamide blend.

At amorphous concentration ranges above and below this miscibility window, the relative strength of the material drops. This drop is believed to be due to phase separations of the semi-crystalline polyamide(s) and the amorphous polyamide(s) into either separate co-continuous and/or discrete phases. In particular, these phase separations are believed to have substantial adverse impacts of the ductilities of the resulting 3D parts, which primarily account for the reductions in the relative strengths.

As further shown in FIG. 4, a plot of curl versus the concentration of amorphous polyamide(s) in the polyamide blend (referred to as plot line 84) illustrates that the curl of a resulting 3D part can be controlled and reduced to acceptable levels within concentration range 86. For example, the curl can be reduced below a threshold curl limit 88, which is the maximum amount of curl that is acceptable, such as about 0.01 inches, pursuant to a Curl Bar Test described below.

Curl can be used as a quantitative method for measuring the residual stress in a 3D part, which is indicative of how many complex geometries can be built with an FDM system. Materials with large amounts of curl can only accurately build very simple geometries such as cylinders printed along the layer-printing direction, which only display simple stresses. Typically, materials that exhibit curl less than about 0.01 inches can be used to print large, complex geometries with extrusion-based additive manufacturing systems.

As used herein, "curl" is the lowest amount of curl achievable from a consumable material, and may be measured pursuant to a Curl Bar Test as described below in the Property Analysis And Characterization Procedure section. The curl of a printed 3D part can be controlled by reducing residual stresses in the 3D part. Residual stress, as stated earlier, may be reduced by printing the 3D part in a heated chamber or at least in a locally-heated deposition region, by anchoring the 3D part with an acid-based support material, or a combination thereof.

Surprisingly, as depicted in FIG. 4, for selected polyamide blends, concentration range 82 (i.e., the miscibility window) overlaps concentration range 86 to define preferred range 90. Within preferred range 90, the PA material is suitable for printing 3D parts that are strong and ductile, and which can be annealed and/or anchored with a support material to reduce the curl of the printed 3D parts down below an acceptable limit (e.g., below threshold curl limit 88).

Accordingly, preferred concentrations of the amorphous polyamide(s) in the polyamide blend range from about 30% to about 70% by weight, more preferably from about 40% to about 60% by weight, and even more preferably from about 45% to about 55% by weight, where the semi-crystalline polyamide(s) constitute the remainder of the polyamide blend. Accordingly, preferred ratios of the amorphous polyamide(s) to the semi-crystalline polyamide(s) range from about 3:7 to about 7:3, more preferably from about 4:6 to about 6:4, and even more preferably from about 4.5:5.5: to about 5.5:4.5.

By way of comparison, a virgin PA6 semi-crystalline material, having no amorphous polyamides, would reside on the leftmost side of the graph shown in FIG. 4. This material would produce a 3D part having a good relative strength and ductility, but would not be annealable to reduce its curl for complex geometries. On the other hand, an amorphous polyamide material, having no semi-crystalline polyamides, would reside on the rightmost side of the graph shown in FIG. 4. This material would produce a 3D part that is annealable to reduce curl, but would exhibit a low relative strength and ductility. The PA material of the present disclosure, however, may be used to print strong and ductile 3D parts that can also be annealed to reduce curl, thereby allowing complex geometries to be printed.

As mentioned above, in some embodiments, the PA material may also include additional additives, such as colorants, fillers, plasticizers, and combinations thereof. In embodiments that include colorants, preferred concentrations of the colorants in the PA material range from about 0.1% to about 5% by weight. Suitable colorants include titanium dioxide, barium sulfate, carbon black, and iron oxide, and may also include organic dyes and pigments.

In embodiments that include fillers, preferred concentrations of the fillers in the PA material range from about 1% to about 25% by weight. Suitable fillers include calcium carbonate, magnesium carbonate, glass spheres, graphite, carbon black, carbon fiber, glass fiber, talc, wollastonite, mica, alumina, silica, kaolin, silicon carbide, zirconium tungstate, soluble salts, and combinations thereof.

In embodiments that include plasticizers, preferred concentrations of the plasticizers in the PA material range from about 0.01% to about 10% by weight. Suitable additional plasticizers for use in the support material include dialkyl phthalates, cycloalkyl phthalates, benzyl and aryl phthalates, alkoxy phthalates, alkyl/aryl phosphates, polyglycol esters, adipate esters, citrate esters, esters of glycerin, and combinations thereof.

In the embodiments including the above-discussed additional additives, the polyamide blend preferably constitutes the remainder of the PA material. As such, the polyamide blend may constitute from about 55% to 100% by weight of the PA material, and more preferably from about 75% to 100% by weight. In some embodiments, the polyamide blend constitutes from about 90% to 100% by weight of the PA material, more preferably from about 95% to 100% by weight. In further embodiments, the PA material consists essentially of the polyamide blend, and optionally, one or more colorants and/or anti-oxidants.

Examples of preferred compositions for the PA material of the present disclosure include a miscible and homogenous blend of a PA6 aliphatic, semi-crystalline polyamide grafted with one or more impact modifier pendant chains (e.g., maleated polyethylene and/or polypropylene impact modifiers), and having a melt flow index ranging from about 5 grams/10 minutes to about 10 grams/10 minutes; and a PA6/3T semi-aromatic amorphous polyamide having a melt flow index ranging from about 1 gram/10 minutes to about 4 grams/10 minutes. In these embodiments, the amorphous polyamide preferably constitutes from about 45% to about 60% by weight of the polyamide blend in the PA material, more preferably from about 50% to about 60% by weight, and even more preferably from about 50% to about 55% by weight, where the semi-crystalline polyamide constitutes the remainder of the polyamide blend in the PA material.

Additional examples of preferred compositions for the PA material of the present disclosure include a miscible and homogenous blend of a PA12 semi-crystalline polyamide, which may optionally be grafted with one or more impact modifier pendant chains; and a PA12 amorphous polyamide having aliphatic and cycloaliphatic blocks. In these embodiments, the amorphous polyamide preferably constitutes from about 50% to about 85% by weight of the polyamide blend in the PA material, more preferably from about 60% to about 80% by weight, and even more preferably from about 65% to about 75% by weight, where the semi-crystalline polyamide constitutes the remainder of the polyamide blend in the PA material.

Preferably, the polyamide blend is also substantially homogenous, allowing each portion of the PA material used in an additive manufacturing system to consistently exhibit the same thermal and physical properties. For example, with system 10 having print head 18, the flow rate of the molten PA material (i.e., melt 70) from nozzle 48 is controlled by the rate at which filament 52 enters liquefier tube 56, and the melting rate of filament 52 within heating zone 68. System 10 may operate with preset instructions for extruding melt 70 at desired flow rates based on tool path geometries. These preset instructions are preferably based on the thermal properties of the PA material, namely the melting rate and viscosity of the PA material.

As such, if the polyamide blend were otherwise non-homogenous, the PA material would not be uniform. This could cause successive segments of filament 52 to melt at different rates, affecting the height of meniscus 74. This accordingly can change the extrusion rate of melt 70 from the preset instructions, which can impair part quality in 3D part 30. Accordingly, filament 52 is preferably manufactured from a PA material having a substantially homogenous polyamide blend of the semi-crystalline polyamide(s) and the amorphous polyamide(s). In embodiments that include one or more additives, the additive(s) are preferably dispersed in the polyamide blend in a substantially uniform manner.

The PA material is preferably provided to an additive manufacturing system (e.g, system 10) in a "dry state", as opposed to a "conditioned state". For example, filament 52 in consumable assembly 22 may be dried prior to being fed to system 10. Dry polyamides typically have lower ductilities compared to conditioned polyamides. However, entrained moisture can adversely affect the extrusion of part materials from print head 18. As such, in some embodiments, the PA material provided to system 10 (e.g., as filament 52 in consumable assembly 22) preferably has a moisture concentration less than about 0.1% by weight, and more preferably less than about 0.8% by weight.

In these embodiments, the PA material in the dry state may have a percent elongation at break of at least about 7%, and more preferably at least about 10%. The PA material in the dry state may also have a tensile strength of at least about 8,000 pounds/square-inch (psi), and more preferably at least about 10,000 psi. Correspondingly, the PA material in the dry state may have a relative strength of at least about 1,000 psi, and more preferably at least about 1,200 psi. As discussed below, after being printed from the dry PA material, 3D part 30 preferably undergoes a conditioning step to absorb moisture, thereby increasing its ductility and relative strength.

For use in system 10, the PA material preferably has a glass transition temperature ranging from about 55° C. to about 95° C., and more preferably from about 80° C. to about 90° C., where the glass transition temperature may be determined using DSC. Similarly, the PA material preferably has a creep relaxation temperature ranging from about 70° C. to about 145° C., and more preferably from about 100° C. to about 130° C., where the creep relaxation temperature may be determined pursuant to the technique disclosed in Batchelder, U.S. Pat. No. 5,866,058.

Furthermore, the PA material in the dry state preferably has a melt flow index ranging from about 1 gram/10 minutes to about 15 grams/10 minutes, and more preferably from about 2 grams/10 minutes to about 6 grams/10 minutes. The PA material in the dry state may also have a heat deflection temperature of at least about 70° C., more preferably of at least about 75° C., where the heat deflection temperature, as used herein, is measured pursuant to ASTM D648-07 using a 1.8 megaPascal (264 psi) load.

Figure 5A:
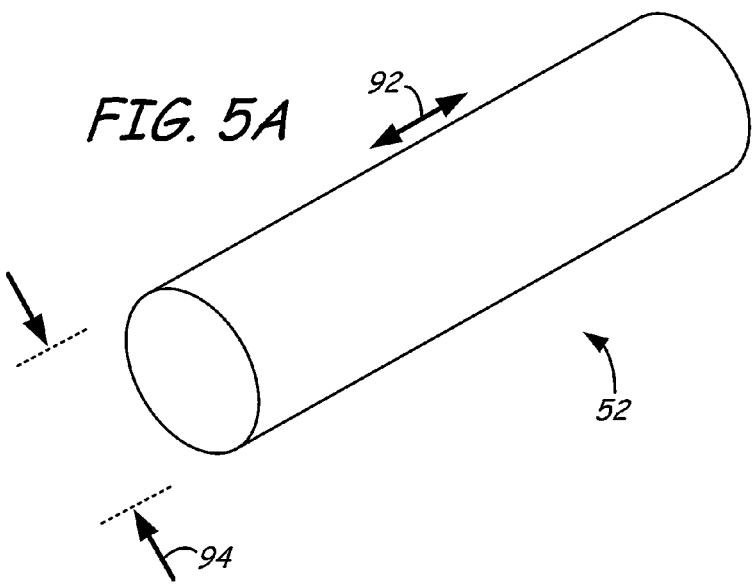
FIG. 5A is a perspective view of a segment of a cylindrical filament of the polyamide material.
Figure 5B:
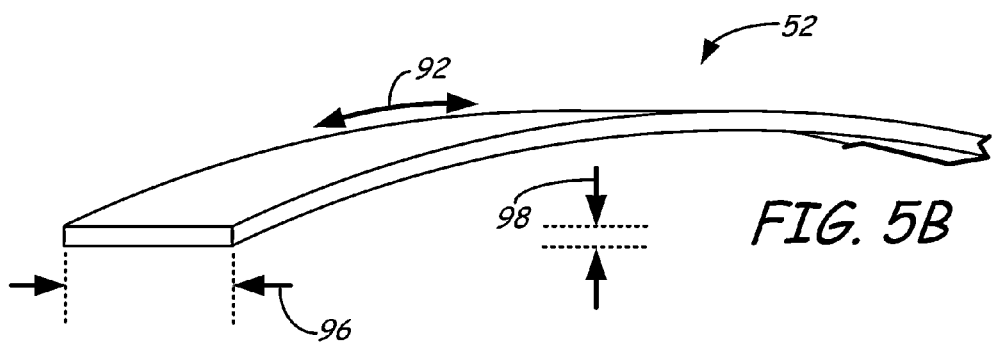
FIG. 5B is a perspective view of a segment of a ribbon filament of the polyamide material.
Figure 5C:
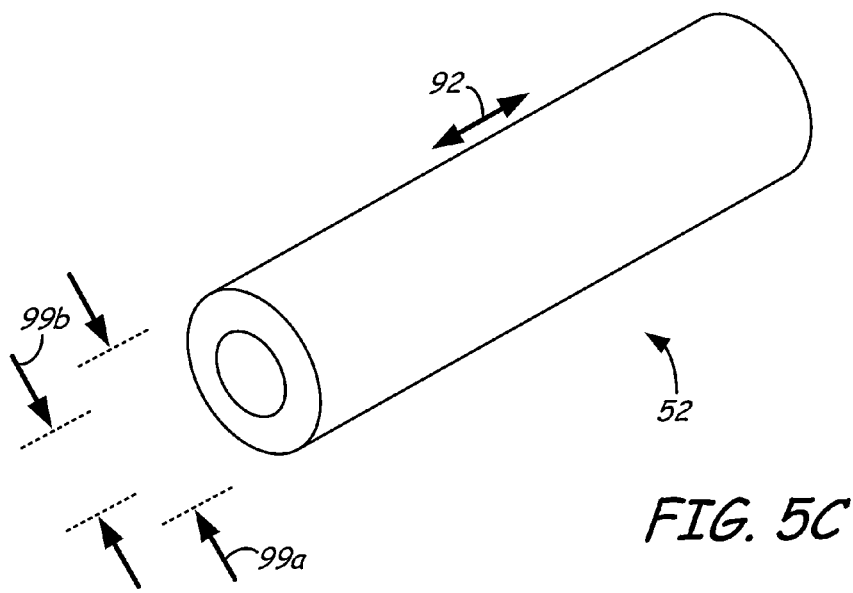
FIG. 5C is a perspective view of a segment of a hollow filament of the polyamide material.

FIGS. 5A-5C illustrate example embodiments for filament 52. As shown in FIG. 5A, filament 52 (and the support material filament) may have a cylindrical or substantially cylindrical geometry, such as those disclosed in Crump, U.S. Pat. No. 5,121,329; Crump et al., U.S. Pat. No. 5,503,785; and Comb et al., U.S. Pat. No. 7,122,246. As shown in FIG. 5A, filament 52 may have a longitudinal length 92 and an average diameter (referred to as diameter 94) along longitudinal length 92.

As used herein, the term "average diameter" of a filament (e.g., diameter 94) is an average based on a 100-foot segment length of the filament. Diameter 94 may be any suitable dimension that allows filament 52 to be received by a print head of an additive manufacturing system (e.g., print head 18). Suitable dimensions for diameter 94 range from about 1.0 millimeter (about 0.04 inches) to about 3.0 millimeters (about 0.12 inches). In some embodiments, diameter 94 preferably ranges from about 1.0 millimeter (about 0.04 inches) to about 1.5 millimeters (about 0.06 inches). In other embodiments, diameter 94 preferably ranges from about 1.5 millimeters (about 0.06 inches) to about 2.0 millimeters (about 0.08 inches). The above-discussed ranges for diameter 94 may alternatively be referred to based on the average cross-sectional area of filament 52.

Alternatively, as shown in FIG. 5B, filament 52 (and the support material filament) may have a non-cylindrical geometry, such as a ribbon filament as disclosed in Batchelder et al., U.S. Pat. No. 8,221,669. In these embodiments, suitable liquefier assemblies for liquefier assemblies 44 and 46 (shown in FIG. 2) include those disclosed in Batchelder et al., U.S. Application Publication No. 2011/0074065; and in Swanson et al., U.S. Application Publication No. 2012/0070523.

As shown in FIG. 5B, filament 52 may have a longitudinal length 92, an average width (referred to as width 96), and an average thickness (referred to as thickness 98). As used herein, the terms "average width" and "average thickness" of a filament (e.g., width 96 and thickness 98) are each an average based on a 100-foot segment length of the filament. Width 96 and thickness 98 may be any suitable dimensions that allows ribbon filament 52 to be received by a print head of an additive manufacturing system (e.g., print head 18). Suitable dimensions for width 96 range from about 1.0 millimeter (about 0.04 inches) to about 10.2 millimeters (about 0.40 inches), and more preferably from about 2.5 millimeters (about 0.10 inches) to about 7.6 millimeters (about 0.30 inches). Suitable dimensions for thickness 98 may range from about 0.38 millimeters (about 0.015 inches) to about 1.3 millimeters (about 0.05 inches), and more preferably from about 0.51 millimeters (about 0.02 inches) to about 1.0 millimeter (about 0.04 inches).

The above-discussed ranges for width 96 and thickness 98 may alternatively be referred to based on the average cross-sectional area of filament 52. Furthermore, the cross-sectional dimensions of filament 52 for the ribbon-filament embodiment shown in FIG. 5B may also be referred to based on the cross-sectional aspect ratio of width 96 to thickness 98. For example, the cross-sectional aspect ratio (width 96-to-thickness 98) may range from about 2:1 to about 20:1. In some embodiments, the cross-sectional aspect ratio ranges from about 2.5:1 to about 10:1, and in further embodiments from about 3:1 to about 10:1.

Furthermore, as shown in FIG. 5C, filament 52 (and the support material filament) may alternatively have a hollow geometry. In this embodiment, filament 52 may have a longitudinal length 92, an average outer diameter (referred to as outer diameter 99a) along longitudinal length 92, and an average inner diameter (referred to as inner diameter 99b) along longitudinal length 92. As used herein, the terms "average outer diameter" and "average inner diameter" of a filament (e.g., outer diameter 99a and inner diameter 99b) are each an average based on a 100-foot segment length of the filament.

Outer diameter 99a and inner diameter 99b may be any suitable dimensions that allows hollow filament 52 to be received by a print head of an additive manufacturing system (e.g., print head 18). Suitable dimensions for outer diameter 99a include those discussed above for diameter 94. Inner diameter 99b may range from about 0.003 inches to about 0.3 inches. In some embodiments, inner diameter 99b preferably ranges from about 0.005 inches to about 0.15 inches. In other embodiments, inner diameter 99b preferably ranges from about 0.01 inches to about 0.03 inches. The above-discussed ranges for outer diameter 99a and inner diameter 99b may each alternatively be referred to based on the average cross-sectional area of filament 52.

In some preferred embodiments, inner diameter 99b is greater than an inner diameter of nozzle 48 (or nozzle 50) of print head 18. This allows the backflow of melt 70 in liquefier tube 56 to pass through the inner annulus of filament 52, rather than flow around the exterior side of filament 52. In particular, the hydraulic resistance of the inner annulus of filament 52 is low compared to the cylindrical sheath between the wall of liquefier tube 56 and the outer surface of filament 52.

Additionally, filament 52 having the hollow geometry as shown in FIG. 5C preferably has a compliance with respect to wheels 54 of drive mechanism 40 that ranges from about two times to about ten times greater than a corresponding compliance of the solid filament 52, as shown in FIG. 5A. In other words, if the hollow filament 52 is too soft, wheels 54 may not be capable of driving filament 52 into liquefier assembly 44. However, a mild amount of compliance can be beneficial to reduce any adverse effects caused by variations in outer diameter 99a. Moreover, diameter oscillations that can be inherent when manufacturing filaments can be accommodated by variations in inner diameter 99b, preferably making it easier to manufacture hollow filament 52 with a near-constant outer diameter 99a compared to a solid filament 52 (e.g., as shown in FIG. 5A).

Furthermore, as also discussed in Batchelder et al., U.S. Pat. No. 8,221,669, hollow filament 52 may allow system 10 to operate with faster liquefier response times and/or feed rates, and liquefier assembly 44 may optionally include a mating core to hollow filament 52, so that the extrudate is heated from the inside as well as the outside.

Yet another advantage of a hollow filament 52 is the reduced thermal conduction at inlet end 64 of liquefier tube 56. When a solid filament is stationary, heat may slowly conduct up the center of the filament to the zone above the heated portion of the liquefier where the walls are relatively cool. If the filament melts there, it tends to solidify against the cooler wall, potentially causing a large axial force to restart filament motion. The rate of heat conduction up a hollow filament, however, will be slower than the rate of conduction up a solid filament due to the lack of a core.

Consumable assembly 22 may include any suitable length of filament 52 as illustrated in FIGS. 5A-5C. Thus, longitudinal length 92 for filament 52 in the embodiments shown in FIGS. 5A-5C is preferably about 100 feet or more. In additional embodiments, filament 52 (e.g., as shown in FIGS. 5A-5C) (and the support material filament) may include topographical surfaces patterns (e.g., tracks) as disclosed in Batchelder et al., U.S. Pat. No. 8,236,227; and/or may include encoded markings as disclosed in Batchelder et al., U.S. Application Publication No. 2011/0233804.

Figure 6A:
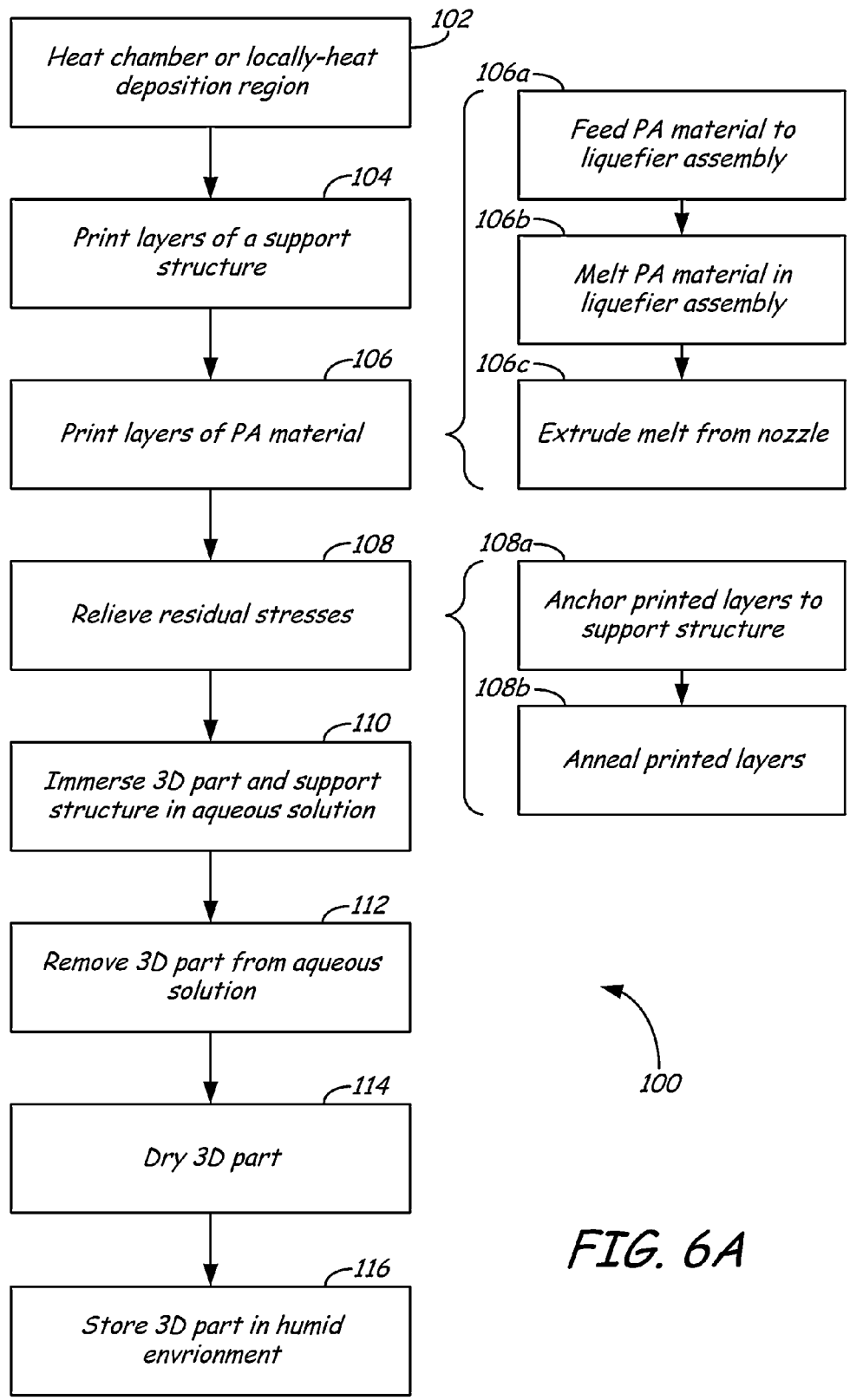
FIG. 6A is a flow diagram of a method for printing a 3D part from the polyamide material.
Figure 6B:
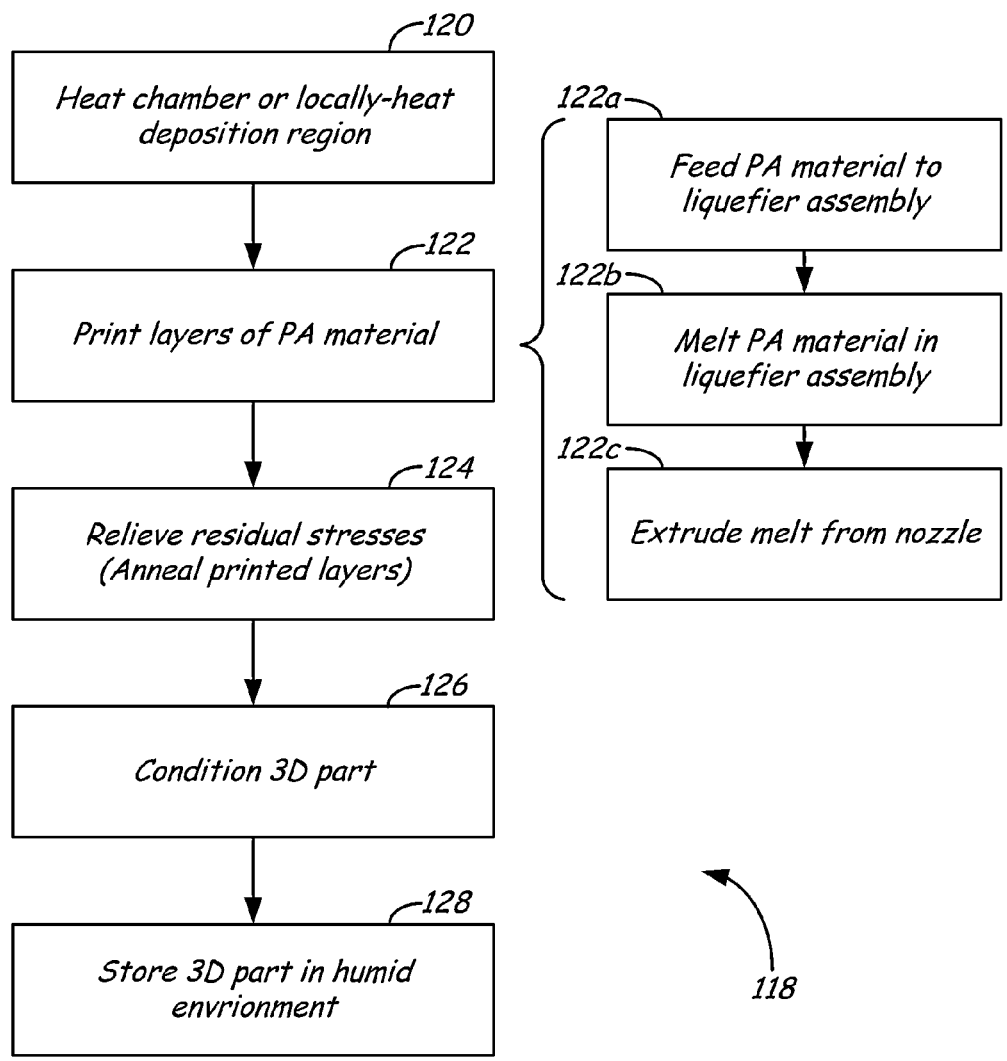
FIG. 6B is a flow diagram of an alternative method for printing a 3D part from the polyamide material without the use of a support material.

FIGS. 6A and 6B illustrate alternative methods 100 and 118 for printing 3D parts from the PA material of the present disclosure. The following discussions of methods 100 and 118 are made with reference to system 10, 3D part 30, and support structure 32 (shown in FIGS. 1-3) with the understanding that methods 100 and 118 are each suitable for use with a variety of different additive manufacturing systems. As shown in FIG. 6A, method 100 includes steps 102-116, and is directed to a process for printing 3D part 30 with the use of an anchoring support structure 32. Method 100 initially involves heating chamber 12 or at least locally heating a deposition region to one or more elevated temperatures suitable for annealing 3D part 30 (and, optionally, support structure 32) (step 102).

Suitable temperature(s) for heating chamber 12 or locally heating the deposition region include temperatures ranging between the solidification temperature and the glass transition temperature of the PA material, more preferably between the creep relaxation temperature and the glass transition temperature of the PA material, and even more preferably at about the creep relaxation temperature of the PA material, or within about 10° C. above or below thereof. Examples of preferred temperatures for heating chamber 12 or locally heating the deposition region range from about 100° C. to about 145° C., more preferably from about 120° C. to about 130° C. In some embodiments, chamber 12 may also be configured to circulate an inert gas, such as argon, to remove any conditions (e.g., air) that may potentially oxidize the PA material.

Controller 34 may then optionally direct print head 18 to print layers of support structure 32 onto platen 14, such as from the support material provided by consumable assembly 24 (step 104). Preferred support materials for printing support structure 32 include acid-based support materials, such as one or more polymers having acrylic acid groups, methacrylic acid groups, or combinations thereof. Examples of preferred acid-based support materials for use with the PA material include soluble support materials commercially available under the tradenames SR10, SR20, SR30, and SR100 Soluble Supports from Stratasys, Inc., Eden Prairie, Minn.; and those disclosed in Crump et al., U.S. Pat. No. 5,503,785; Lombardi et al., U.S. Pat. Nos. 6,070,107 and 6,228,923; Priedeman et al., U.S. Pat. No. 6,790,403; and Hopkins et al., U.S. Pat. No. 8,246,888. Alternatively, suitable support materials include alcohol-based polymers, such as polyvinyl alcohol.

Controller 34 may then direct print head 18 to print layers of 3D part 30 from the PA material onto the previously-printed layers of support structure 32 (step 106). For example, the PA material may be fed to liquefier assembly 44 as filament 52 (step 106a), melted in liquefier assembly 44 (step 106b), and extruded from nozzle 48 as a series of roads to form the layers of 3D part 30 (step 106c).

It has been found that the acid groups of the support material generate hydrogen bonds with the carbonyl groups of the semi-crystalline polyamide(s) and the amorphous polyamide(s), such as shown with the following reaction formula:

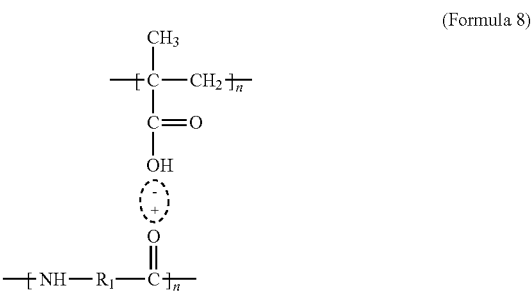

(Formula 8)

This hydrogen bonding creates a strong interfacial bond between the printed layers of the support material and the printed layers of the PA material, allowing support structure 32 to anchor 3D part 30 to platen 14 (or to a film on platen 14, and/or to previous layers of the PA material).

The interfacial bond between the layers of 3D part 30 and support structure 32, as well as the elevated temperatures of chamber 12 (or the locally-heated deposition region), relieve at least a portion of the residual stresses generated in the layers of 3D part 30 (step 108). For example, the anchoring of 3D part 30 to support structure 32 with the strong interfacial bond allows support structure 32 to restrain the bottom-most layers of 3D part 30 from curling while the layers cool down (step 108a). Furthermore, the elevated temperature(s) of chamber 12 (or the locally-heated deposition region) reduces the rates at which the layers of 3D part cool down, thereby annealing the layers to relieve some of the residual stresses (step 108b).

Another surprising characteristic of the PA material is that it can retain a relatively high heat capacity despite a significant concentration of the amorphous polyamide(s). Preferred heat capacities for the PA material may vary depending on the particular polyamides utilized. Examples of preferred heat capacities for the PA material incorporating a PA6 polyamide range from about 285 Joules/Kelvin (J/K) to about 330 J/K, more preferably from about 310 J/K to about 320 J/K, where the heat capacity, as used herein, is measured pursuant to ASTM D3418-12 at the extrusion temperature. Examples of preferred heat capacities for the PA material incorporating a PA6,6 polyamide range from about 560 Joules/Kelvin (J/K) to about 650 J/K. It is found that the relatively high heat capacities allows the polyamide polymers of the extruded roads to more thoroughly interdiffuse with each other, and with subsequently formed layers. This increases the interlayer bonding and reduces porosity in 3D part 30, preferably forming fully consolidated layers, which can increase the strength of 3D part 30.

Figure 13:
FIG. 13 is a micrograph of a cutaway section of a 3D part printed from a first example polyamide material of the present disclosure, illustrating fully consolidated layers.
Figure 14:
FIG. 14 is a micrograph of a cutaway section of a 3D part printed from a second example polyamide material of the present disclosure, illustrating fully consolidated layers.

For example, as shown below in FIGS. 13 and 14, when a given 3D part is sectioned to show its interior structure, the extruded roads and layers are not visibly distinguishable to the naked eye, and the 3D part appears as a fully consolidated part. In comparison, as shown below in FIG. 15, extrusion-based additive manufacturing systems typically print 3D parts from amorphous materials that are porous. As such, when a given 3D part from the amorphous material is sectioned to show the interior structure, the extruded roads and layers of the printed amorphous materials are individually distinguishable to the naked eye. This is due in part to the lower heat capacities of the amorphous materials.

In some embodiments, due to the high heat capacity, it may be suitable to have a minimum duration for printing each layer of 3D part 30. While this may potentially increase printing time, particularly for small 3D parts, it may be desirable to ensure that the previously-printed layers are sufficiently cool to support the successive roads of the molten PA material. As such, when generating tool path instructions for printing 3D part 30 from the PA material, computer 38 (shown in FIG. 1) may set the instructions such that each printed layer has a sufficient amount of time to cool down to an acceptable state. Alternatively, system 10 may incorporate active cooling units configured to cool down each printed layer.

After the printing operation in system 10 is completed, the 3D part 30/support structure 32 combination may be removed from chamber 12 and immersed in an aqueous solution to at least partially dissolve support structure 32 (step 110). As mentioned above, the strong interfacial bonding between 3D part 30 and support structure 32 is beneficial for relieving residual stresses from 3D part 30 while printing. However, it also effectively prevents support structure 32 from being broken off from 3D part 30 without potentially damaging 3D part 30. Instead, the soluble nature of support structure 32 allows it to be dissolved away from 3D part 30.

Depending on the particular chemistry of the support material, the aqueous solution may be water, or may be an alkaline solution, as discussed in Dunn et al., U.S. Application Publication No. 2011/0186081 and in Swanson et al., U.S. patent application Ser. No. 13/241,454. The dissolution duration may vary depending on the support material used, the aqueous solution used, the agitation rate of the aqueous solution, and the sizes and geometries of 3D part 30 and support structure 32. It has also been found that, in embodiments that incorporate a detergent material to produce an alkaline solution, the alkaline solution does not chemically attack the PA material of 3D part 30.

Furthermore, the dissolution rate may be reduced by heating the aqueous solution during the support removal operation of step 110. However, the aqueous solution temperature is preferably below the heat deflection temperature of the PA material to reduce the risk of warping 3D part 30 during the support removal process. As such, the temperature of the aqueous solution is preferably maintained at one or more temperatures that are more than 10° C. below the heat deflection temperature of the PA material.

In addition to removing support structure 32 from 3D part 30, the support removal process with the aqueous solution may also expedite conditioning of 3D part 30. As mentioned above, the PA material in a dry state has a lower ductility than in a conditioned state, as is typical for nylon-type polyamides. Accordingly, the exposure of 3D part 30 to the aqueous solution during the support removal process causes 3D part 30 to absorb water.

After support structure 32 is removed, 3D part 30 may be removed from the aqueous solution (step 112) and dried down to a conditioned state (step 114). This precludes the need to condition 3D part 30 in a separate step. Preferred water concentrations in the PA material of 3D part 30 in its conditioned state range from about 0.5% to about 2% by weight, and more preferably from about 0.7% to about 1.5%. Since 3D part 30 typically has a much higher moisture content when removed from the aqueous solution, 3D part 30 may be dried down to the preferred water concentration, thereby providing the 3D part 30 in a conditioned state. 3D part 30 may be dried down using a variety of different drying techniques, such as with a heated oven, optionally with a vacuum drawn. Alternatively, 3D part 30 may be allowed to air dry at ambient conditions for a given duration until the conditioned state is reached.

3D part 30 may optionally be stored in a container or other environment that maintains a suitable humidity for keeping 3D part 30 in a conditioned state (step 116). For example, 3D part 30 may be shipped to a customer in a package having a moisture-sealing liner and a damp material (e.g., a soaked sponge, towel, or other material that may retain water). While sealed in the liner, 3D part 30 may absorb water from the humid atmosphere (provided by the damp material) as necessary to maintain a moisture equilibrium, preferably at the desired water content in 3D part 30 (e.g., from about 0.5% to about 2% by weight water).

In a conditioned state, as measured pursuant to ASTM D4066-01a, a 3D part printed from the PA material preferably exhibits a tensile strength of at least about 8,000 psi, and more preferably at least 9,000 psi. Moreover, in the conditioned state, the 3D part printed from the PA material preferably exhibits a tensile strength in the z-direction of at least about 7,000 psi, and more preferably at least 8,000 psi. Additionally, in the conditioned state, the 3D part printed from the PA material preferably exhibits a percent elongation at break of at least about 20%, and more preferably of at least about 25%.

Correspondingly, in the conditioned state, the 3D part printed from the PA material preferably exhibits a relative strength (from Equation 1 above) of at least about 1,600 psi, and more preferably of at least about 2,000 psi. Furthermore, in the conditioned state, the 3D part printed from the PA material preferably exhibits a tensile modulus of at least about 300 kilopound/square inch (ksi, 1000 psi), and more preferably of at least about 325 ksi; and a tensile modulus in the z-direction of at least about 250 ksi, and more preferably at least about 280 ksi, where, as used herein, the tensile modulus is measured pursuant to ASTM D638-10.

Furthermore, the PA material is preferably capable of printing 3D parts with low curl, namely a curl less than about 0.01 inches, more preferably to less than about 0.008 inches, and even more preferably to less than about 0.006 inches, pursuant to the Curl Bar Test described below. For example, the PA material may be used to print 3D parts having dimensions greater than 8-inches×8-inches×8-inches, with asymmetric geometries and/or fine features, that are dimensionally stable (i.e., little or no curl). As discussed above, the polyamide blend within its miscible window has been found to produce 3D parts having good strengths and ductilities, as well as low curl. As such, the 3D parts are suitable for use in a variety of industrial and commercial applications.

FIG. 6B illustrates method 118, which is an alternative to method 100 for printing 3D part 30 without the use of a support material or support structure. As such, method 118 may be performed with single-material additive manufacturing systems, such as low-cost 3D printers, for example. Method 118 includes steps 120-128, where steps 120, 122, and 124 correspond to steps 102, 106, and 108 of method 100. In this embodiment, however, the layers of 3D part 30 may be printed directly onto platen 14 (or onto a platen film). For example, a base structure of the PA material may be initially printed onto platen 14 with a geometry that is breakable from 3D part 30 (e.g., a porous or hatched base structure). After the printing operation is complete, the base structure may be removed, and 3D part 30 may optionally undergo a separate conditioning process (step 126).

For example, 3D part 30 may be immersed in a water bath until a sufficient amount of water is absorbed and/or dried to a desired water content. Preferred water concentrations in the PA material of 3D part 30 in its conditioned state include those discussed above. 3D part 30 may be dried down using a variety of different drying techniques, such as with a heated oven, optionally with a vacuum drawn. Alternatively, 3D part 30 may be allowed to air dry at ambient conditions for a given duration until the conditioned state is reached.

3D part 30 may also optionally be stored in a container or other environment that maintains a suitable humidity for keeping 3D part 30 in a conditioned state (step 128), which may be performed in the same manner as discussed above for step 116 of method 100. In some embodiments, steps 126 and 128 may be combined into a single step, where 3D part 30 is stored in a humid container or other suitable environment to allow 3D part 30 to absorb water from the humid atmosphere. For example, a dry 3D part 30 may be shipped to a customer in a package having a moisture-sealing liner and a damp material (e.g., a soaked sponge, towel, or other material that may retain water). While sealed in the liner, 3D part 30 may absorb water from the humid atmosphere (provided by the damp material) until a moisture equilibrium is reached, preferably at the desired water content in 3D part 30 (e.g., from about 0.5% to about 2% by weight water).

Figure 7A:
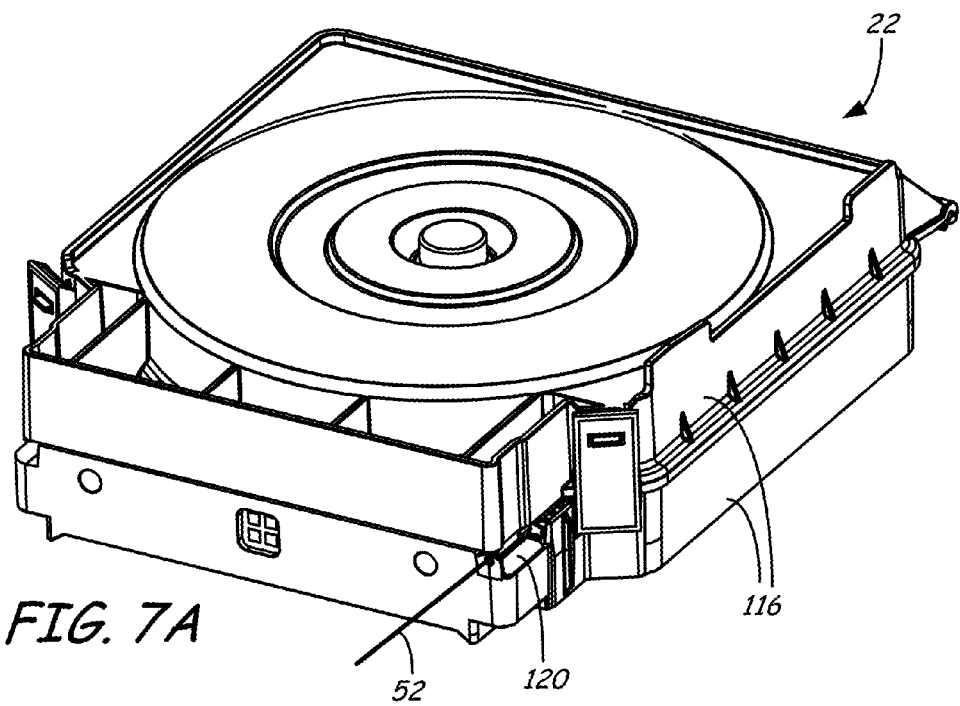
FIG. 7A is a perspective view of a first embodied consumable assembly for retaining a supply of the polyamide material in filament form.
Figure 7B:
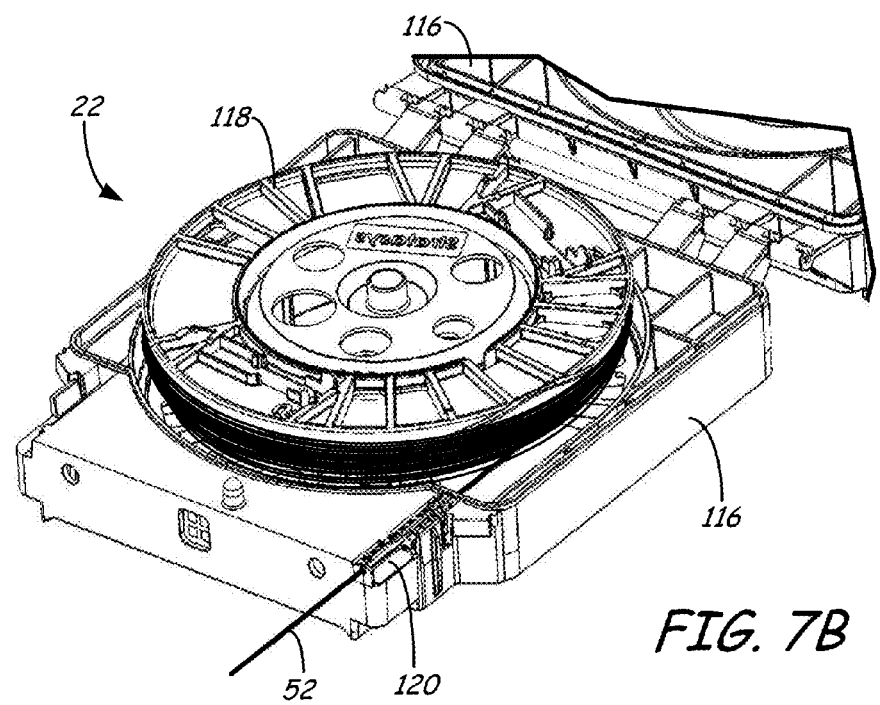
FIG. 7B is a perspective view of the first embodied consumable assembly in an open state, illustrating an interior of the first embodied consumable assembly.

FIGS. 7A-11 illustrate examples of suitable consumable assemblies for consumable assembly 22 (and optionally, consumable assembly 24). For example, FIGS. 7A and 7B illustrates consumable assembly 22 with a container portion 116, spool 118, and guide mechanism 120, where container portion 116 is configured to open and close in a sealing manner as shown to retain spool 118 and guide mechanism 120. Spool 118 accordingly retains a supply of filament 52 of the PA material, and relays filament 52 out of consumable assembly 22 via guide mechanism 120.

During use, container portion 116 may be loaded to or otherwise engaged with system 10, which aligns guide mechanism 120 with a reciprocating orifice of system 10 (not shown) to deliver filament 52 to guide tube 26. Examples of preferred devices for consumable assembly 22 in this embodiment include those disclosed in Taatjes et al, U.S. Pat. Nos. 7,938,351 and 7,938,356. Alternatively, consumable assembly 22 may have spool and cassette arrangements as disclosed in Swanson et al., U.S. Pat. No. 6,923,634 and Comb et al., U.S. Pat. No. 7,122,246.

Figure 8A:
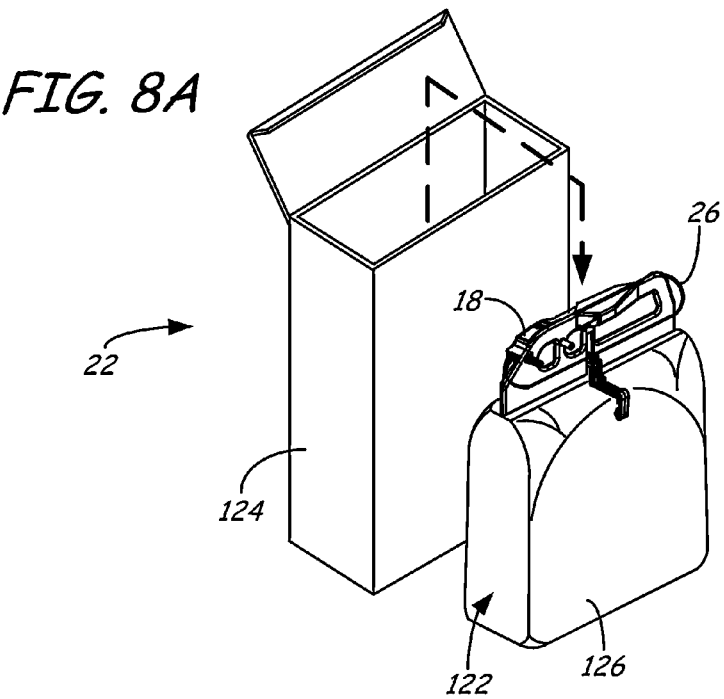
FIG. 8A is a perspective view of a second embodied consumable assembly for retaining a supply of the polyamide material in filament form.
Figure 8B:
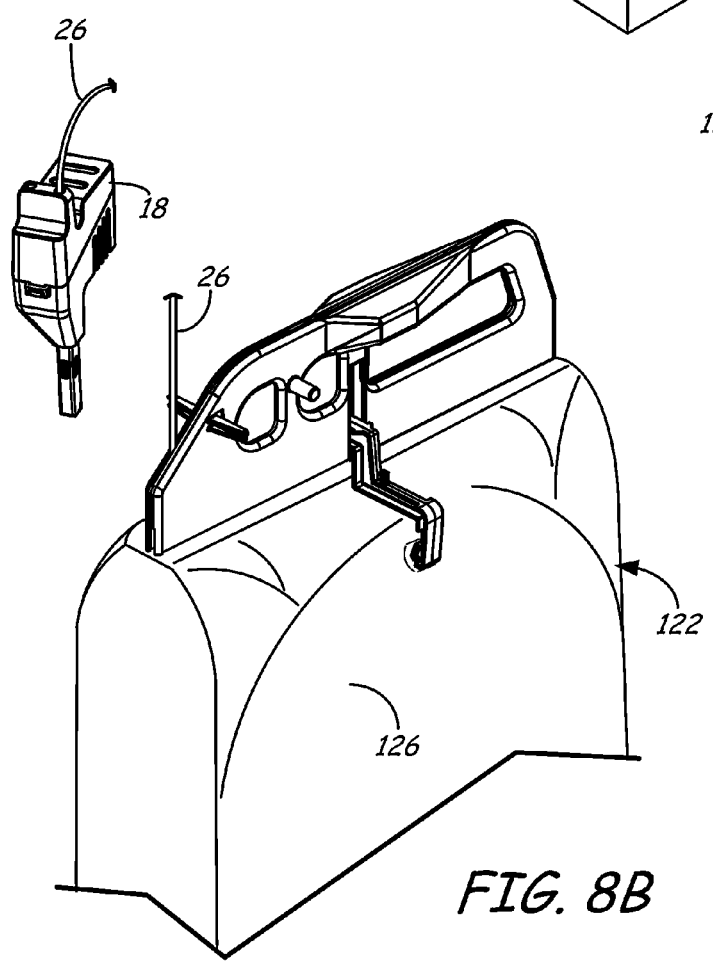
FIG. 8B is an expanded perspective view of the second embodied consumable assembly, illustrating an integrated print head and guide tube.
Figure 8C:
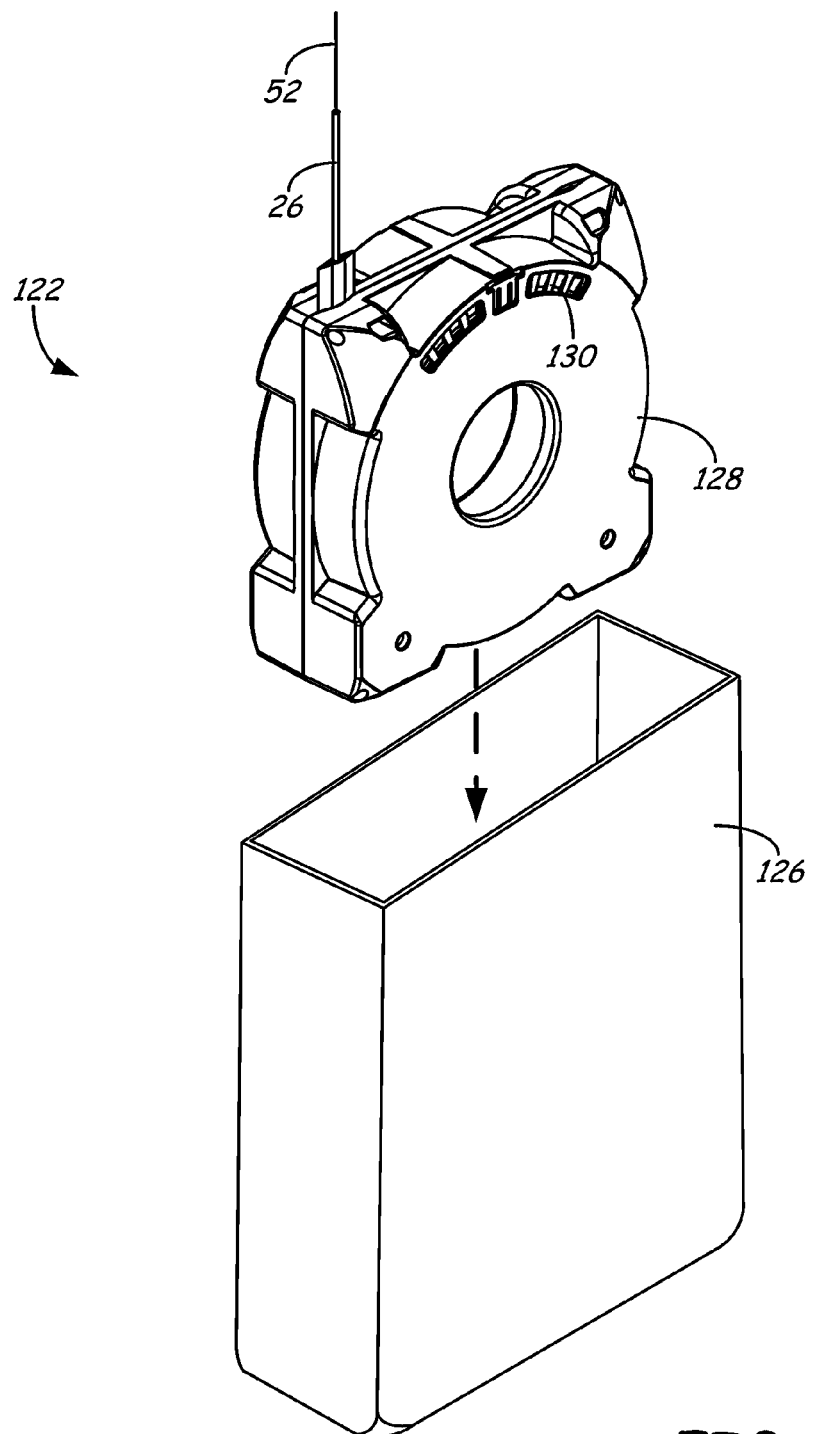
FIG. 8C is a perspective view of a container portion of the second embodied consumable assembly.

FIGS. 8A-8C illustrate an alternative embodiment for print head 18, consumable assembly 22, and guide tube 26, which are combined into a single, removable assembly, such as disclosed in Mannella et al., U.S. patent application Ser. Nos. 13/334,896 and 13/334,910. As shown in FIG. 8A, in this embodiment, consumable assembly 22 preferably includes container portion 122, which may be retained in a storage box 124, and is configured to mount print head 18 and guide tube 26.

As shown in FIG. 8B, print head 18 and guide tube 26 may be unmounted from container portion 122 and loaded to system 10 such that print head 18 is moveably retained by head gantry 20, such as disclosed in Swanson, U.S. Patent Application Publication Nos. 2010/0283172 and 2012/0164256. As shown in FIG. 8C, container portion 122 may include liner 126, rigid module 128, and spool 130, where spool 130 is rotatably mounted within rigid module 128 and retains a supply of filament 52 of the PA material. Rigid module 128 may also be secured within liner 126, which is preferably a moisture and/or gas-barrier liner.

Figure 9:
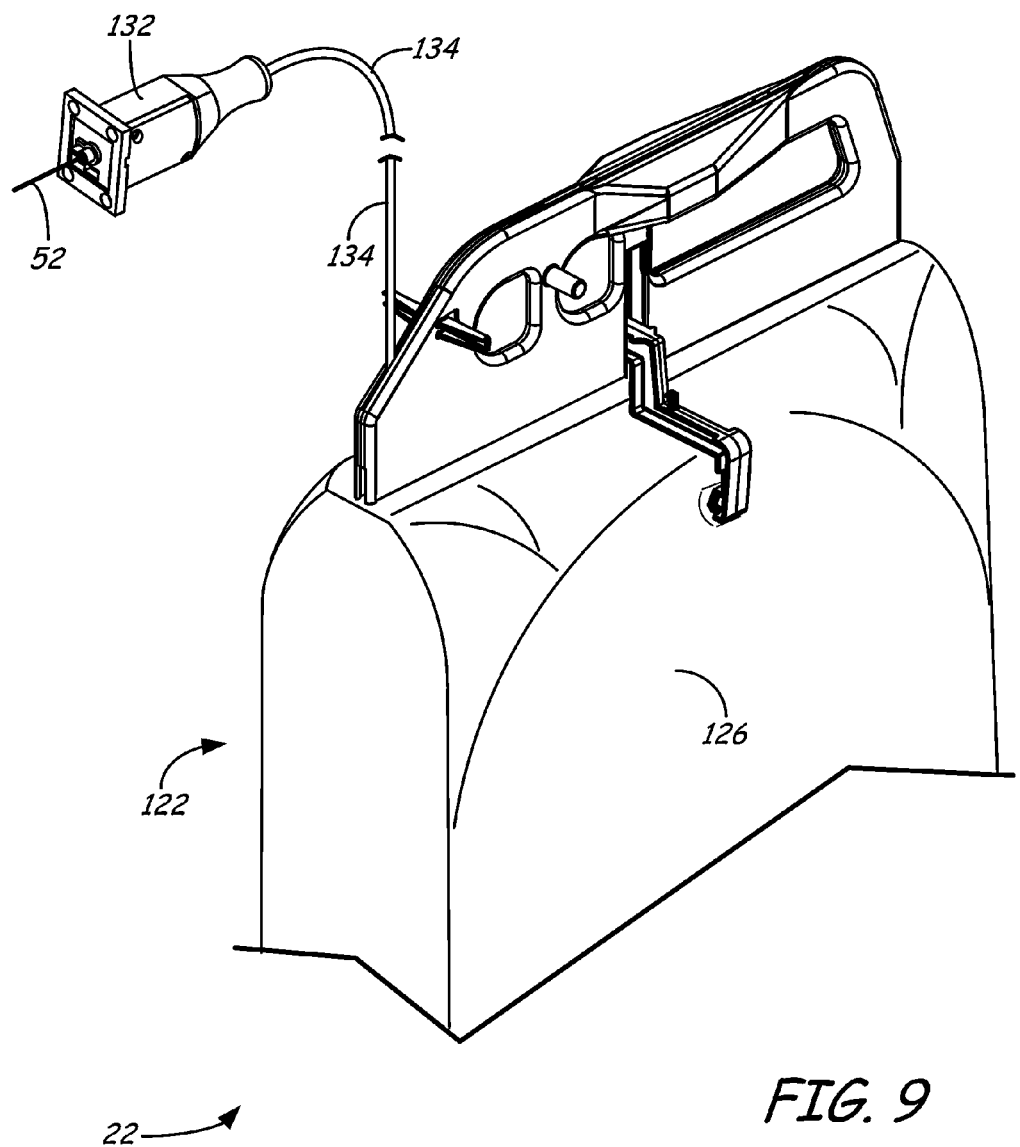
FIG. 9 is a perspective view of a portion of a third embodied consumable assembly, illustrating an integrated coupling adapter and guide tube.

FIG. 9 illustrates another alternative embodiment for consumable assembly 22, which is similar to the embodiment shown in FIGS. 8A-8C, but includes coupling adapter 132 and external guide tube 134, which are configured to engage an external port of system 10 (not shown) for feeding filament 52 to guide tube 26 and print head 18. Preferred devices for consumable assembly 22 in this embodiment include those disclosed in Swanson et al., U.S. patent application Ser. No. 13/334,934.

Figure 10:
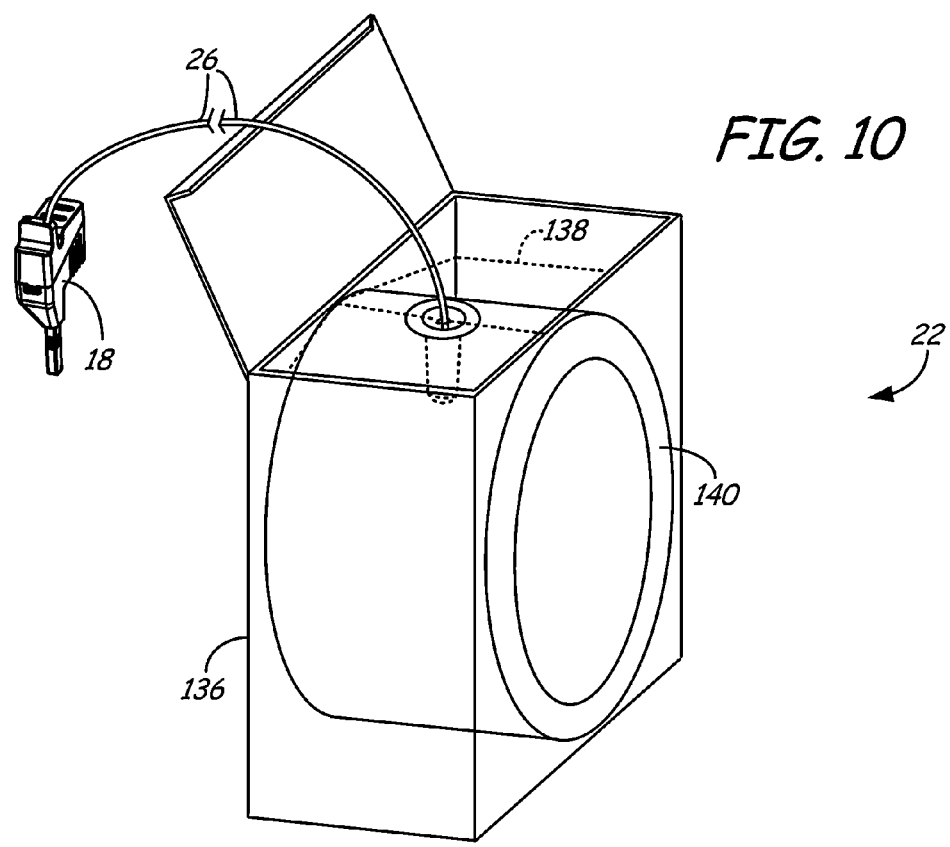
FIG. 10 is a perspective view of a fourth embodied consumable assembly for retaining a supply of the polyamide material in filament form as a coil, and including an integrated print head and guide tube.

FIG. 10 illustrates yet another alternative embodiment for consumable assembly 22, which is also similar to the embodiment shown in FIGS. 8A-8C, but includes print heat 18, guide tube 26, container portion 136, liner 138, and spool-less coil 140 of filament 52. In this embodiment, guide tube 26 may extend within liner 138 and/or coil 140 to guide successive segments of filament 52 from coil 140 to print head 18. Liner 138 is preferably a moisture and/or gas-barrier liner configured to encase coil 140. Preferred devices for consumable assembly 22 in this embodiment include those disclosed in Swanson et al., U.S. patent application Ser. No. 13/334,921.

Figure 11:
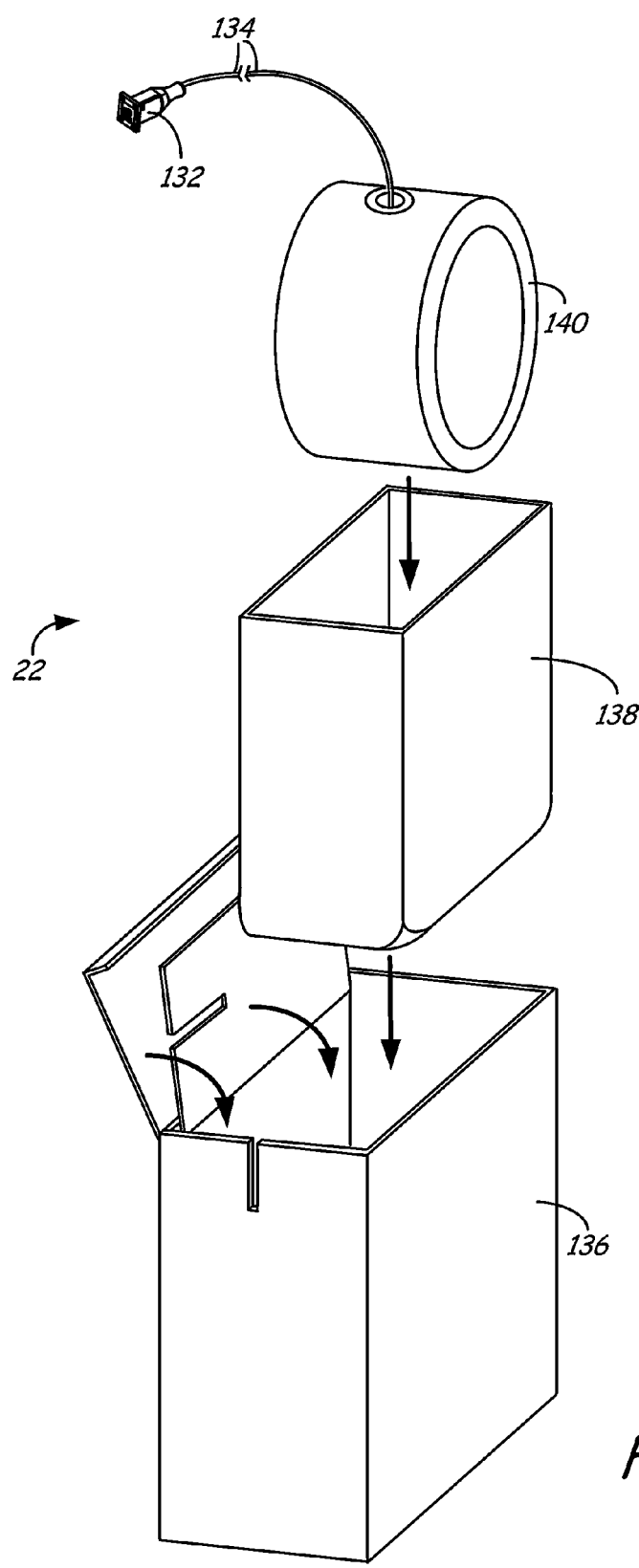
FIG. 11 is a perspective view of a portion of a fifth embodied consumable assembly, illustrating an integrated coupling adapter and guide tube, and a supply the polyamide material in filament form as a coil.

FIG. 11 illustrates another alternative embodiment for consumable assembly 22, which is a combination of the embodiments shown in FIGS. 9 and 10, and includes coupling adapter 132, external guide tube 134, container portion 136, liner 138, and coil 140 of filament 52. Preferred devices for consumable assembly 22 in this embodiment include those disclosed in Swanson et al., U.S. patent application Ser. No. 13/334,921.

In each of the above-discussed embodiments for consumable assembly 22 (e.g., as shown in FIGS. 7A-11), the retained supply of filament 52 is preferably maintained in a dry state. As such, consumable assembly 22 may be pre-dried and sealed to prevent moisture absorption. Additionally, consumable assembly 22 may include one or more desiccant packs to maintain a dry environment during transportation, storage, and use. In alternative embodiments, the PA material may be unsealed and exposed to atmospheric conditions during storage, transportation, and use with system 10.

In a further alternative embodiment, filament 52 may be fed to system 10 from consumable assembly 22 (e.g., as shown in FIGS. 7A-11) in a conditioned state and then dried in system 10 prior to reaching print head 18. For example, system 10 may include a separate drying element (e.g., a dry air blower, not shown) located upstream from print head 18 that dries filament 52 down from its conditioned state to a drier state for use in print head 18. This embodiment is beneficial for increasing the ductility of filament 52 prior to reaching print head 18, which reduces the risk of filament 52 breaking while being stored in consumable assembly 22 (e.g., as shown in FIGS. 7A-11) and while traveling through guide tube 26.

Accordingly, in this embodiment, consumable assembly 22 may retain a damp material (e.g., a soaked sponge, towel, or other material that may retain water) rather than a desiccant pack. Filament 52 may then absorb water from the humid atmosphere (provided by the damp material) until a moisture equilibrium is reached, preferably at a desired water content in filament 52 (e.g., from about 0.5% to about 2% by weight water).

Property Analysis and Characterization Procedure

Various properties and characteristics of the constructions cited herein may be evaluated by various testing procedures as described below:

Curl Bar Test

This Curl Bar Test is an example test to measure the amount of curl that is achievable from a 3D part printed with a polyamide material. The printing is performed in a layer-by-layer manner using an extrusion-based additive manufacturing system commercially available from Stratasys, Inc., Eden Prairie, Minn. under the trademarks "FDM" and "FORTUS 400mc", where the polyamide material is provided to the system as a filament having an average diameter of 0.07 inches.

The test initially involves printing a part cap layer of the polyamide material based on tool path instructions to ideally have a 15-inch horizontal length, a 0.5-inch horizontal width, and a single layer vertical height. A support cap layer of a support material is then printed on the part cap layer, where the support cap layer is printed from tool path instructions to ideally have the same above-mentioned dimensions as the first cap layer. The support material for the support cap layer is commercially available from Stratasys, Inc., Eden Prairie, Minn. under the trademark "SR100".

Figure 12A:
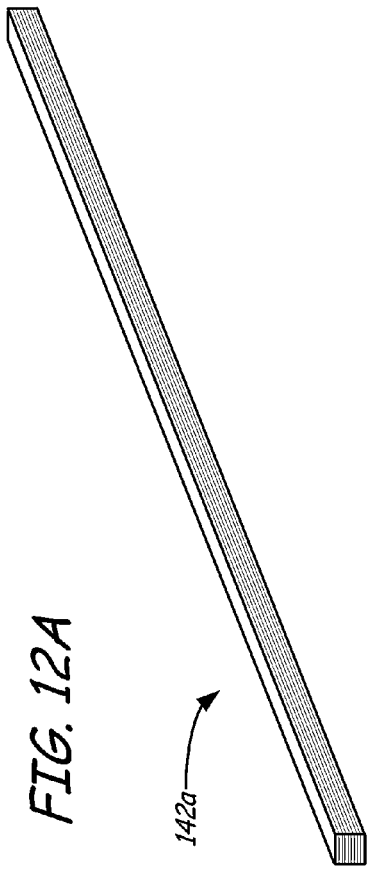
FIG. 12A is a perspective illustration of a test bar for use in a Curl Bar Test.

A test bar of the polyamide material is then printed on the support cap layer, where the test bar is printed from tool path instructions to ideally have a 15-inch horizontal length, a 0.5-inch vertical height, and a 0.5-inch horizontal width. If the test bar were to be printed without any curl, it would appear similar to test bar 142a shown in FIG. 12A, where the layers of test bar 142a are exaggerated in thickness for ease of viewing.

Because the curl to be measured is intended to be the lowest amount of curl achievable with the tested polyamide material, the particular printing parameters in above-identified the extrusion-based additive manufacturing system (e.g., liquefier temperature, chamber/deposition region temperature, nozzle diameter, and the like) are controlled to achieve the lowest possible amount of curl for the printed test bar, as measured below, for a printing rate of 8 inches/second and a part density greater than 98% by volume.

In one aspect, the printing parameters include a liquefier set point temperature of 328° C., a print head nozzle diameter of 0.016 inches, an extrusion flow rate of 8 inches/second, and a part density greater than 98% by volume. The chamber of the system is maintained at a set point temperature of 130° C.

Figure 12B:
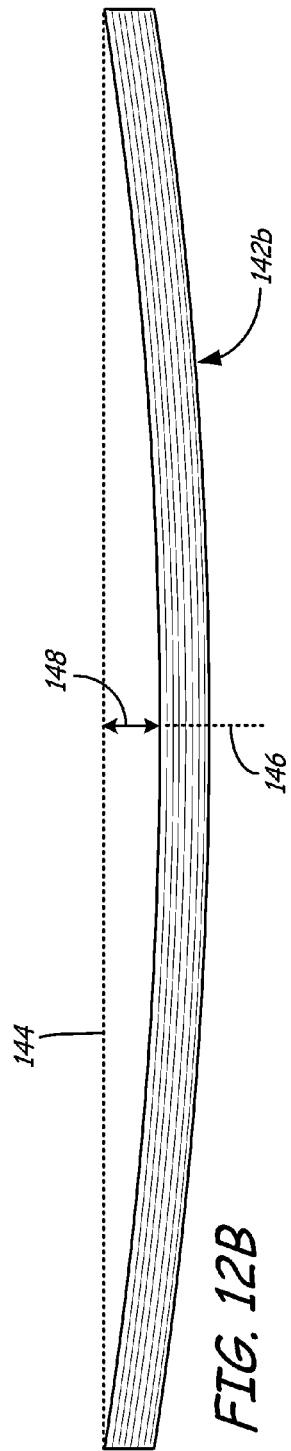
FIG. 12B is a side view of a test bar being measured for curl, pursuant to the Curl Bar Test.

After the test bar is printed, it is removed from the system, and placed in an alkaline bath to remove the support cap layer (and the part cap layer). The resulting test bar is then optionally dried to a desired conditioned or dried state, and measured for curl at room temperature (25° C.). The curl of the consumable material will manifest itself by the ends of the test bar curling up, such that the test bar will bow as illustrated by test bar 142b in FIG. 12B. The curl measurement involves identifying a line that connects the ends of test bar, illustrated as line 144 in FIG. 12B, and locating the midpoint along the test bar between the ends, shown as midpoint 146 (i.e., 7.5 inches from either end). The amount of curl is then measured as the height of the displacement between line 144 and the surface of test bar at the midpoint 146, as illustrated by arrowed line 148. This height of the displacement may be measured with a micrometer, where a flat test bar will exhibit 0.000 inches of curl.

EXAMPLES

The present disclosure is more particularly described in the following examples that are intended as illustrations only, since numerous modifications and variations within the scope of the present disclosure will be apparent to those skilled in the art. Unless otherwise noted, all parts, percentages, and ratios reported in the following examples are on a weight basis, and all reagents used in the examples were obtained, or are available, from the chemical suppliers described below, or may be synthesized by conventional techniques.

Miscibility Comparison

PA materials of Examples 1-6 were prepared with different polyamide blend ratios and quantitatively compared for mechanical properties and curl. Each PA material included the same semi-crystalline polyamide and amorphous polyamide. The semi-crystalline polyamide was a graft PA6 aliphatic polyamide commercially available under the tradename ULTRAMID 8253HS from BASF Corporation, Florham Park, N.J. The amorphous polyamide was a PA6/3T polyamide commercially available under the tradename TROGAMID T5000 from Evonik Industries AG, Germany. Table 1 lists the polyamide blend ratios for the PA materials of Examples 1-6, where the PA materials did not include any additives.

TABLE 1

| Example | Grafted PA 6 (Percent by weight) | PA 6/3T (Percent by weight) |
| --- | --- | --- |
| Example 1 | 80 | 20 |
| Example 2 | 70 | 30 |
| Example 3 | 60 | 40 |
| Example 4 | 50 | 50 |
| Example 5 | 40 | 60 |
| Example 6 | 30 | 70 |

The PA materials of Examples 1-6 were each tested for percent elongation at break, tensile strength, and curl. The percent elongation at break and the tensile strength were each measured pursuant to ASTM D638-10. The relative strength of each PA material was then calculated as the product of the percent elongation at break and the tensile strength, pursuant to Equation 1 shown above.

The curl was measured by the Curl Bar Test, as described above, with a liquefier set point temperature of 328° C., a print head nozzle diameter of 0.016 inches, an extrusion flow rate of 8 inches/second, and a part density greater than 98% by volume. The chamber of the system is maintained at a set point temperature of 130° C. Table 2 lists the measured percent elongations at break, tensile strengths, and curl results, and the calculated relative strengths, for the PA materials of Examples 1-6.

TABLE 2

| Example | Percent elongation at break (%) | Tensile strength (psi) | Relative Strength (psi) | Curl (inches) |
| --- | --- | --- | --- | --- |
| Example 1 (20% PA 6/3T) | 26 | 8,925 | 2,321 | 3.5 |
| Example 2 (30% PA 6/3T) | 12 | 9,471 | 1,159 | 2.0 |
| Example 3 (40% PA 6/3T) | 19 | 9,944 | 1,895 | 1.0 |
| Example 4 (50% PA 6/3T) | 24 | 10,320 | 2,477 | 0.005 |
| Example 5 (60% PA 6/3T) | 8 | 10,617 | 841 | 0.004 |
| Example 6 (70% PA 6/3T) | 6 | 9,660 | 625 | 0.006 |

As shown in Table 2, the percent elongations at break, tensile strengths, relative strengths, and curl results for the PA materials of Examples 1-6 generally followed the plot lines shown in FIG. 4. For instance, the percent elongations at break, tensile strengths, and relative strengths peaked at a polyamide blend ratio of about 50/50 of the grafted semi-crystalline polyamide to the amorphous polyamide (Example 4).

As discussed above, while not wishing to be bound by theory, this peak range is believed to be the result of the miscibility of the graft semi-crystalline polyamide and the amorphous polyamide. At lower and higher concentrations of the amorphous polyamide, the relative strength of the material dropped and fluctuated, primarily due to variations in the percent elongation at break. This is believed to be due to the semi-crystalline polyamide and the amorphous polyamide phase separating into co-continuous and/or discrete phases.

As further shown in Table 2, the curl of a resulting 3D part can be controlled and reduced to acceptable levels for amorphous polyamide concentrations greater than about 40% (e.g., Examples 4-6). As can be seen, the good mechanical properties and the curl control have overlapping concentration ranges. Moreover, the PA material of Example 4, having a 50/50 blend ratio exhibited exceptional mechanical properties and curl control. Accordingly, this PA material is particularly suitable for printing 3D parts that are strong and ductile, and which can be annealed and anchored with a support material to reduce curl to produce dimensionally-stable 3D parts.

Liquefier reliability Testing

The PA material of Example 4 was also tested for reliability in print head liquefier assemblies of an extrusion-based additive manufacturing system having different nozzle sizes. Prior to the test runs, the PA material of Example 4 was formed into a filament geometry having an average diameter of about 0.07 inches and wound onto spools of consumable assemblies. For each run, the consumable assembly was loaded to an extrusion-based additive manufacturing system commercially available from Stratasys, Inc., Eden Prairie, Minn. under the trademarks "FDM" and "FORTUS 400mc". The filament was then fed from the consumable assembly to print head liquefier assembly of the system, melted, and extruded from print head nozzle to print 3D parts.

During a first run, the nozzle diameter was 0.016 inches. In this run, the liquefier was heated to a 330° C. set point and the chamber of the system was heated to a 120° C. set point. The filament was then fed with a push force less than 8 pounds with an extrusion rate that matched the standard extrusion rate for a polycarbonate part material. Filaments from three successive consumable assemblies were fed to the print head, melted, and extruded through the nozzle without any issues, such as filament breakage prior to reaching the print head, buckling or mushrooming of the filaments at the inlet end of the liquefier tube, or nozzle clogging.

A second run was performed in the same manner as the first run, but the previous nozzle was replaced with a nozzle having a 0.012-inch diameter. Additionally, the liquefier was heated to a 345° C. set point, and the chamber of the system was heated to a 120° C. set point. In this run, the PA material filaments from three successive consumable assemblies also reliably extruded from the nozzle without any issues.

A third run was performed in the same manner as the first and second runs, but the previous nozzles were replaced with a nozzle having a 0.010-inch diameter. Additionally, the liquefier was heated to a 350° C. set point, and the chamber of the system was heated to a 110° C. set point. In this run, the PA material filaments from three successive consumable assemblies also reliably extruded from the nozzle without any issues.

Mechanical Property Comparisons

PA materials of Examples 7-10 were prepared and commercially available materials of Comparative Examples A-H were quantitatively measured for their percent elongations at break, tensile strengths, and tensile moduli. The PA material of Example 7 was the same composition as shown above for Example 4 (conditioned 50/50 blend of the grafted PA6 semi-crystalline polyamide and the PA6/3T amorphous polyamide). The PA material of Example 8 was also the same composition as shown above for Examples 4 and 7, but was in a dry state (i.e., non-conditioned).

The PA material of Example 9 included a conditioned blend of 60% by weight of a semi-crystalline polyamide, 15% by weight of an amorphous polyamide, and 25% by weight of a milled carbon fiber. The semi-crystalline polyamide was a PA6 aliphatic polyamide commercially available under the tradename ULTRAMID 8202HS from BASF Corporation, Florham Park, N.J. The amorphous polyamide was a PA6/3T polyamide commercially available under the tradename TROGAMID T5000 from Evonik Industries AG, Germany. The milled carbon fiber was a filler commercially available from Finite Fiber, Akron Ohio.

The PA material of Example 10 was a conditioned 50/50 blend of a grafted PA12 aliphatic polyamide commercially available under the tradename GRILAMID L20 GHL from EMS-Chemie, Inc., Sumter, S.C. (business unit of EMS-Grivory), and a cycloaliphatic polyamide commercially available under the tradename TROGAMID CX9704 from Evonik Industries AG, Germany.

The PA materials of Examples 7-10 were each tested for percent elongation at break, tensile strength, and tensile modus, pursuant to ASTM D638-10. The relative strength of each PA material was then calculated as the product of the percent elongation at break and the tensile strength, pursuant to Equation 1 shown above. Table 3 lists the measured percent elongations at break, tensile strengths, and tensile moduli, and the calculated relative strengths, for the PA materials of Examples 7-10. As shown in Table 3, the PA materials of Examples 7 and 8 were tested in both in the xy-direction and the z-direction.

TABLE 3

| Example | Percent elongation at break (%) | Tensile strength (psi) | Relative Strength (psi) | Tensile modulus (ksi) |
| --- | --- | --- | --- | --- |
| Example 7 | 25 | 9,200 | 2,300 | 325 |
| Example 7 (z-direction) | 5 | 6,700 | 335 | 290 |
| Example 8 | 13 | 10,200 | 1,285 | 340 |
| Example 8 (z-direction) | 4.5 | 8,200 | 369 | 305 |
| Example 9 | 3 | 11,500 | 345 | 715 |
| Example 10 | 25 | 6,500 | 1,625 | 280 |

The results in Table 3 were then compared to corresponding results for commercially available materials of Comparative Examples A-H. The materials of Comparative Examples A-D were polyamide materials for selective laser sintering (SLS) applications, and the materials for Comparative Examples E-H were amorphous polymers for extrusion-based additive manufacturing applications. Table 4 shown below lists the published percent elongations at break, tensile strengths, and tensile moduli, and the calculated relative strengths, for the materials of Comparative Examples A-H.

Comparative Example A was a virgin PA12 polyamide commercially available from Solid Concepts, Valencia, Calif. Comparative Example B was a carbon filled PA12 polyamide commercially available under the tradename NYTEK 1200 CF from Solid Concepts, Valencia, Calif. Comparative Example C was a carbon filled PA 12 polyamide commercially available under the tradename PA 640 GSL from Advanced Laser Materials, LLC, Temple, Tex. Comparative Example D was a virgin PA11 polyamide commercially available under the tradename NYTEK N11 from Solid Concepts, Valencia, Calif.

Comparative Example E was a polyetherimide consumable material commercially available under the tradename ULTEM 9085 from Stratasys, Inc., Eden Prairie, Minn. Comparative Example F was a modified acrylonitrile-butadiene-styrene (ABS) consumable material commercially available under the tradename ABS-M30 from Stratasys, Inc., Eden Prairie, Minn. Comparative Example G was a polycarbonate/acrylonitrile-butadiene-styrene consumable material commercially available from Stratasys, Inc., Eden Prairie, Minn. Comparative Example H was a polycarbonate consumable material commercially available from Stratasys, Inc., Eden Prairie, Minn.

TABLE 4

| Example | Percent elongation at break (%) | Tensile strength (psi) | Relative Strength (psi) | Tensile modulus (ksi) |
|---|---|---|---|---|
| Comparative Example A | 20 | 7,100 | 1420 | 250 |
| Comparative Example B | 4 | 9,000 | 315 | 800 |
| Comparative Example C | 3 | 7,100 | 185 | 554 |
| Comparative Example D | 25 | 6,700 | 1675 | 245 |
| Comparative Example E | 6 | 10,400 | 624 | 322 |
| Comparative Example F | 4 | 5,200 | 208 | 350 |
| Comparative Example G | 6 | 5,900 | 354 | 278 |
| Comparative Example H | 5 | 9,800 | 490 | 330 |

A comparison of the results shown in Tables 3 and 4 illustrate the good strengths and ductilities of the PA materials of Examples 7-10. For example the PA material of Example 7 exhibited a relative strength that was greater than those exhibited by any of the materials of Comparative Examples A-H. As mentioned above, the relative strength of a consumable material combines part strength and ductility measurements, and is a good indicator for the robustness, fatigue life, and allowables of printed 3D parts.

Part Consolidation Comparison

Figure 15:
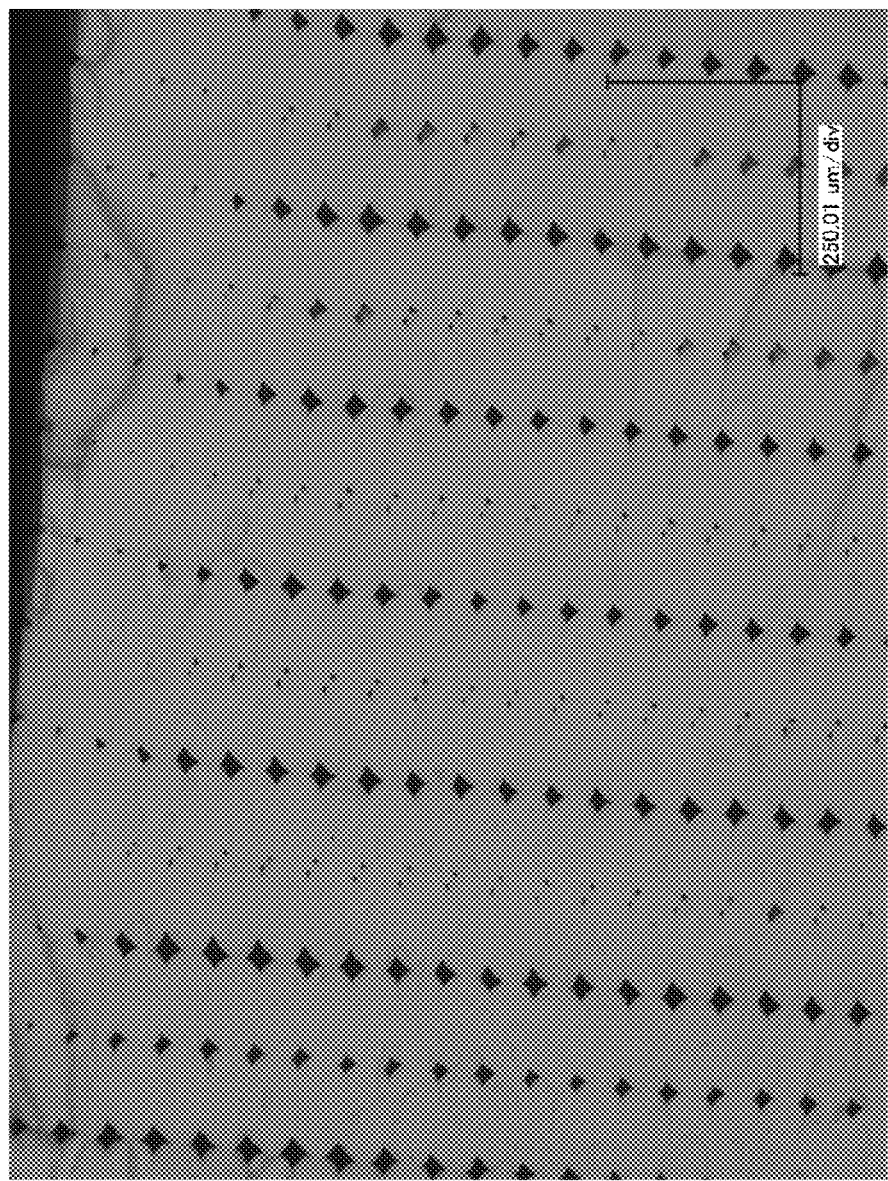
FIG. 15 is a micrograph of a cutaway section of a 3D part printed from a comparative amorphous material, illustrating non-consolidated layers.

Samples 3D parts printed from the PA materials of Examples 7 and 9, and the material of Comparative Example F were also sectioned (i.e., cut open) to observe the layering and porosities of each sample. FIGS. 13-15 respectively show the internal layers of Example 7 and 9, and Comparative Example F. As shown in FIGS. 13 and 14, the sample of Examples 7 and 9 did not have any visually observable layering or porosity. As discussed above, the relatively high heat capacities allow the PA materials of the extruded roads to more thoroughly interdiffuse with each other, and with subsequently formed layers. This increases the interlayer bonding and reduces porosity in the 3D parts, forming fully consolidated layers as shown in FIGS. 13 and 14.

In comparison, as shown in FIG. 15, the sample of Comparative Example F exhibited substantial layering and porosity. This is believed to be due in part to the lower heat capacity of the ABS material compared to those of Examples 7 and 9. As such, the PA materials of the present disclosure are suitable for printing consolidated 3D parts having good part strengths and ductilities.

PA12 Composition Testing

Multiple PA materials of Examples 11 and 12 were prepared with a blend of different amorphous and semi-crystalline polyamides from those of Examples 1-10, which were quantitatively compared for mechanical properties and curl. For each PA material, the semi-crystalline polyamide was a graft PA12 polyamide commercially available under the tradename GRILAMID L16 from EMS-Chemie, Inc., Sumter, S.C. (business unit of EMS-Grivory). The amorphous polyamide was a PA12 polyamide commercially available under the tradename GRILAMID TR90EMS-Chemie, Inc., Sumter, S.C. (business unit of EMS-Grivory).

For the PA materials of Examples 11 and 12, the semi-crystalline polyamide concentration in the PA material ranged from 27.2%-28.2% by weight, and the amorphous polyamide concentration in the PA material ranged from 65.2%-66.2% by weight, for a blend ratio of about 70:30 of the amorphous polyamide to semi-crystalline polyamide. The PA materials of Examples 11 and 12 also included an impact modifier having a concentration in the PA material ranging from 4.5%-5.5% by weight, and an anti-oxidant having a concentration in the PA material ranging from 0.03%-0.13% by weight. The PA materials of Examples 11 and 12 had the same compositions except that the PA materials of Example 11 were not conditioned, and the PA materials of Example 12 were conditioned.

The PA materials of Examples 11 and 12 were each tested for percent elongation at break, tensile strength, and tensile modus, pursuant to ASTM D638-10. The relative strength of each PA material was then calculated as the product of the percent elongation at break and the tensile strength, pursuant to Equation 1 shown above. Table 5 lists the average measured percent elongations at break, tensile strengths, and tensile moduli, and the calculated relative strengths, for the PA materials of Examples 11 and 12, both in the xy-direction and in the z-direction.

TABLE 5

| Example | Percent elongation at break (%) | Tensile strength (psi) | Relative Strength (psi) | Tensile modulus (ksi) |
|---|---|---|---|---|
| Example 11 | 9.5 | 7700 | 731.5 | 190 |
| Example 11 (z direction) | 5 | 6900 | 345 | 180 |
| Example 12 | 30 | 7000 | 2100 | 190 |
| Example 12 (z direction) | 5 | 6400 | 320 | 180 |

The results shown in Table 5 illustrate the good strengths and ductilities of the PA materials of Examples 11 and 12, based on PA12 polyamides, particularly for the conditioned PA materials of Example 12. As mentioned above, the relative strength of a consumable material combines part strength and ductility measurements, and is a good indicator for the robustness, fatigue life, and allowables of printed 3D parts.

Additionally, curl was measured for the PA materials of Example 12 by the Curl Bar Test, as described above, with a liquefier set point temperature of 328° C., a print head nozzle diameter of 0.016 inches, an extrusion flow rate of 8 inches/second, and a part density greater than 98% by volume. The chamber of the system was maintained at a set point temperature of 130° C. Based on the Curl Bar Test, the PA materials of Example 12 exhibited an average curl of 0.006 inches. Accordingly, the PA materials of Example 12 exhibited low curl in addition to having good part strengths and ductilities.

All patent and patent application documents referenced in the present disclosure are incorporated by reference to the extent that they do not conflict with the present disclosure. Although the present disclosure has been described with reference to preferred embodiments, workers skilled in the art will recognize that changes may be made in form and detail without departing from the spirit and scope of the disclosure.

The invention claimed is:

1. A method for printing a three-dimensional part with an additive manufacturing system, the method comprising:
   providing a consumable material comprising a polyamide blend having at least one semi-crystalline polyamide and at least one amorphous polyamide that is substantially miscible with the at least one semi-crystalline polyamide, wherein the at least one amorphous polyamide constitutes from about 50% by weight to about 85% by weight of the polyamide blend and wherein the consumable material has a solidification temperature and a glass transition temperature, and wherein the consumable material is capable of printing a three-dimensional part having a curl less than about 0.01 inches pursuant to a Curl Bar Test, and has a relative strength in a conditioned state of at least about 1,600 psi;
   heating a chamber of the additive manufacturing system or locally heating a deposition region of the additive manufacturing system to a temperature between the solidification temperature and the glass transition temperature of the consumable material;
   feeding the consumable material to a liquefier assembly retained by the additive manufacturing system;
   melting the consumable material in the liquefier assembly; and
   extruding the molten consumable material from the liquefier assembly as a series of roads in the heated chamber or the locally-heated deposition region to print the three-dimensional part in a layer-by-layer manner.

2. The method of claim 1, wherein the at least one semi-crystalline polyamide comprises a graft semi-crystalline polyamide having impact modifiers grafted to a polyamide backbone.

3. The method of claim 1, and further comprising printing a support structure in a layer-by-layer manner from a support material comprising acid groups, alcohol groups, or combinations thereof, wherein extruding the molten consumable material from the liquefier assembly as the series of roads in the heated chamber or the locally-heated deposition region comprises depositing the roads on the support structure.

4. The method of claim 3, and further comprising generating hydrogen bonding between the three-dimensional part and the support structure.

5. The method of claim 3, and further comprising immersing the three-dimensional part and the support structure in an aqueous solution, which at least partially dissolves the support structure and increases a moisture concentration in the three-dimensional part.

6. The method of claim 1, and further comprising conditioning the three-dimensional part to increase ductility of the three-dimensional part.

7. A consumable material for use in an additive manufacturing system, the consumable material comprising:
   a polyamide blend comprising:
      at least one semi-crystalline polyamide; and
      at least one amorphous polyamide that is substantially miscible with the at least one semi-crystalline polyamide, wherein the at least one amorphous polyamide constitutes from about 50% by weight to about 85% by weight of the polyamide blend and wherein the consumable material is capable of printing a three-dimensional part having a curl less than about 0.01 inches pursuant to a Curl Bar Test, and a relative strength in a conditioned state of at least about 1,600 psi; and
   a physical geometry configured to be received by the additive manufacturing system for printing a three-dimensional part from the consumable material in a layer-by-layer manner using an additive manufacturing technique.

8. The consumable material of claim 7, wherein the at least one amorphous polyamide constitutes from about 60% by weight to about 80% by weight of the polyamide blend.

9. The consumable material of claim 7, wherein the at least one semi-crystalline polyamide comprises a graft semi-crystalline polyamide having impact modifiers grafted to a polyamide backbone.

10. The consumable material of claim 7, wherein the curl of the three-dimensional part is less than 0.008 inches.

11. The consumable material of claim 7, wherein the at least one semi-crystalline polyamide comprises an aliphatic polyamide having a formula selected from the group consisting of

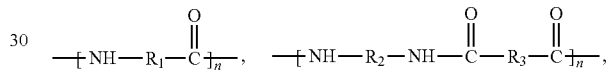

graft copolymers thereof, and combinations thereof, wherein $R_1$, $R_2$, and $R_3$ are each a hydrocarbon chain having 3-12 carbon atoms, and wherein n is a whole number.

12. The consumable material of claim 7, wherein the at least one semi-crystalline polyamide comprises a PA12 semi-crystalline polyamide having a backbone grafted with an impact modifier pendant chain, wherein the at least one amorphous polyamide comprises a PA12 amorphous polyamide having an amorphous backbone, and wherein the PA12 amorphous polyamide constitutes from about 65% by weight to about 75% by weight of the polyamide blend.

13. A consumable assembly for use in an extrusion-based additive manufacturing system, the consumable assembly comprising:
   a container portion;
   a consumable filament at least partially retained by the container portion, the consumable filament comprising:
      a polyamide blend comprising:
         at least one semi-crystalline polyamide; and
         at least one amorphous polyamide that is substantially miscible with the at least one semi-crystalline polyamide, wherein the at least one amorphous polyamide constitutes from about 50% by weight to about 85% by weight of the polyamide blend and wherein the consumable material is capable of printing a three-dimensional part having a curl less than about 0.01 inches pursuant to a Curl Bar Test, and a relative strength in a conditioned state of at least about 1,600 psi; and
      a filament geometry configured to be received by the extrusion-based additive manufacturing system for printing a three-dimensional part from the consumable filament in a layer-by-layer manner using an additive manufacturing technique.

14. The consumable assembly of claim 13, wherein the at least one amorphous polyamide constitutes from about 60% by weight to about 80% by weight of the polyamide blend.

15. The consumable assembly of claim 14, wherein the at least one amorphous polyamide constitutes from about 65% by weight to about 75% by weight of the polyamide blend.

16. The consumable assembly of claim 13, wherein the at least one semi-crystalline polyamide comprises a graft semi-crystalline polyamide having impact modifiers grafted to a polyamide backbone.

17. The consumable assembly of claim 13, wherein the at least one amorphous polyamide comprises an aromatic polyamide, a cycloaliphatic polyamide, or combinations thereof.

18. The consumable assembly of claim 13, wherein the relative strength of the three-dimensional part in the conditioned state is at least about 2,000 psi.

* * * * *